United States Patent Office 3,232,830
Patented Feb. 1, 1966

3,232,830
INSECTICIDAL (THIO) PHOSPHINIC ACID ESTERS
Gerhard Schrader, Wuppertal-Cronenberg, Walter Lorenz and Reimer Cölln, Wuppertal-Vohwinkel, and Hanshelmut Schlör, Wuppertal-Barmen, Germany, assignors to Farbenfabriken Bayer Aktiengesellschaft, Leverkusen, Germany, a corporation of Germany
No Drawing. Filed Mar. 9, 1959, Ser. No. 797,834
Claims priority, application Germany, Mar. 18, 1958, F 25,267; Apr. 2, 1958, F 25,467; May 5, 1958, F 25,688; May 30, 1958, F 25,855; June 21, 1958, F 26,007; July 19, 1958, F 26,209, F 26,210
8 Claims. (Cl. 167—22)

The present invention relates to new and useful derivatives of phosphinic or thiophosphinic acids and to processes producing the same. Generally the new compounds of this invention may be represented by the following formula:

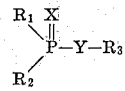

In this formula X and Y stand for oxygen or sulfur, at least one of them being sulfur, $R_1$ and $R_2$ stand for alkyl or aryl radicals, one of them being an alkyl radical, and $R_3$ stands for alkyl or aryl radicals which may be substituted by various other groups.

A number of thiophosphinic acid esters are well known as excellent insecticides or plant-protecting agents, thus e.g., parathion is known to be one of the first compounds of this type, which has been used in the agricultural field. In the class of thiophosphoric acid ester insecticides there are also substances which act systemically, i.e., from the interior of the plant, if plants are treated with them. A compound long known for this purpose is demetone. There have also been used some phosphonic or thiophosphonic acid esters as plant protecting agents or pesticides besides the above mentioned phosphoric acid ester derivatives. Regarding some resistances of various pests against phosphoric or phosphonic acid ester derivatives, however, there is a need for still further compounds in this field.

Thus it is an object of the present invention to find other new and useful phosphorus derivatives with pesticidal properties and useful in the agricultural field. Other objects are methods to prepare these compounds. Still further objects will become apparent within the following description.

In accordance with the present invention it has been found that a new class of compounds called thiophosphinic acid derivatives exhibits a strong pesticidal action which makes these compounds useful for practical purposes in the agricultural field. Generally the new compounds may be represented by the above shown formula:

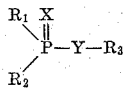

in which the symbols have the same significance as given above. More detailed the radicals $R_1$, $R_2$ and $R_3$ may have the following significance: $R_1$ stands for alkyl radicals, preferably those having 1–6 carbon atoms and being straight, branched or cyclic; $R_2$ may be of same nature or may stand for an aryl radical, preferably a phenyl radical which furthermore may be substituted preferably by lower alkyl radicals up to 4 carbon atoms, chlorine or bromine atoms, nitro groups, lower alkoxy groups, lower alkyl mercapto groups, and the like; $R_3$ at last may stand for alkyl or aryl radicals which may be substituted. The $R_3$ alkyl radicals preferably should have more than 4 carbon atoms and if substituted should bear alkoxy groups, alkyl mercapto groups, primary or secondary amino groups, alkoxy carbonyl groups, aryl groups, especially phenyl groups, which furthermore may be substituted by halogen, and the groups mentioned before, amino carbonyl groups, cyano groups, halogen atoms, and the like. Further possibilities will become apparent from the following description or from the examples. Aryl groups may include such radicals which have substituents such as lower alkyl groups, halogen atoms (chlorine, bromine), nitro groups, alkoxy groups, alkyl mercapto groups, alkoxy carbonyl groups, and the like. Still further possibilities also here will become apparent throughout the description and the examples. $R_3$ also may be a heterocyclic radical especially such one being known in the thiophosphoric acid derivatives-field and having pesticidal properties if combined with said thiophosphoric acid ester radicals. Such radicals include, e.g., certain derivatives of 1,4-dioxane, of γ-pyrone, of benzazimide and the like.

There are many possibilities to prepare the new compounds of the present invention. Thus, if dithio-phosphinic acid esters are desired one may react salts of dithiophosphinic acids with compounds containing a reactive halogen atom. This reaction may be shown by the following formulae:

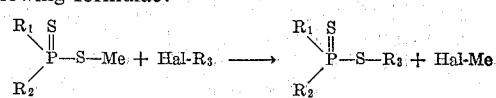

The symbols $R_1$ to $R_3$ have the same significance as shown above. Me preferably stands for an alkali metal atom or the ammonium group, Hal stands preferably for chlorine or bromine. As some examples for the reactant Hal-$R_3$ there may be mentioned but without limiting the present invention in any way the following compounds: α-chloro-acetone, α-chloromethyl-alkyl- or aryl ether or thio ethers, α-chloro-methyl-propionate, α-bromo-propionic acid esters and amides, chloro-acetic acid esters and amides, α-bromo-phenyl acetic acid esters, benzyl chloride, alkylmercapto-substituted benzyl chlorides. α,α'-dichloro-methyl ether or thio-ether, methylene bromide, bromo-succinic acid esters, N-(halogen-methyl)-compounds, β-chloro-ethyl ether or thio-ethers, β-chloro-propyl ethers or thio-ethers, β-chloro-propion nitrile, β-chloro-ethyl pyridines or quinolines, β,β,β-trichloro-ethyl amine, N(β-chloroethyl)-compounds of amides or heterocyclic compounds in which the nitrogen atom has acid properties, β-chloro-ethyl dialkyl amides, piperidides or morpholides, γ-bromo-propyl ethers or thio-ethers, γ-bromo-butyric acid nitrile, γ-chloro or γ-bromo-propyl dialkyl amides, and the like.

The above shown reaction preferably is carried out in suitable inert organic solvents such as lower alcohols, ketones, dimethyl formamide, or aceto nitrile, at temperatures between about room temperature and 100° C.

The salts of dithiophosphinic acids used for the above said reaction may be obtained from the corresponding dithiophosphinic acid chlorides with alkali metal hydrogen sulfides especially potassium hydrogen sulfide.

The aforementioned thiophosphinic acid chlorides which were also not known as yet may be prepared from the known bis(di-substituted-thionophosphines) by reacting those compounds with about the theoretically necessary amount of chlorine or sulfuryl chloride (the thiophosphinic acid bromides may be obtained accordingly).

The two aforementioned reactions may be shown by the following reaction scheme:

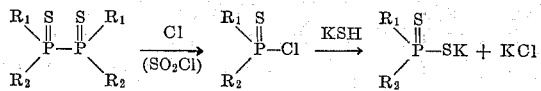

There is another possibility to obtain the thiophosphinic acid chlorides which consists in reacting thiolphosphonites with carbon-tetra-chloride, as it is to be seen from the following reaction scheme:

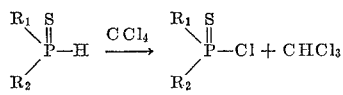

Dithiophosphinic acid esters may also be obtained in another way, i.e., by reacting the aforementioned dithiophosphinic acid chlorides with suitable mercaptans in the presence of an acid-binding agent. This reaction may be shown by the following equation:

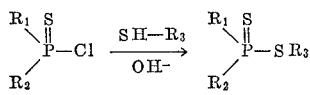

There may also be used every possible mercaptan of aliphatic or aromatic or heterocyclic nature to accomplish this reaction. Also here this reaction preferably is carried out in the presence of suitable inert solvent such as lower ketones or alcohols, but also benzene, toluene, xylene, and the like. The temperature range in which the present reaction has to be carried out varies within wider limits according to the mercaptan used. Generally also a range within about room temperature and 100° C. is the best.

According to the last described method also thionophosphinic acid esters are obtainable if phenols or alcohols (generally hydroxy-group-containing-substances) are reacted with thionophosphinic acid chlorides. Alcohols include such complex-alcohols as, e.g., secondary butanol, pinacoline alcohol (branched chained alcohols), as well as such substituted alkanols in which the alkyl group bears such substituents as alkoxy groups, alkyl mercapto groups, aryl mercapto groups, amino groups, cyano groups, halogen groups, nitro groups, and the like. Also the phenols may preferably be substituted by lower alkyl groups, halogen atoms, nitro groups, amino groups, alkoxy carbonyl groups, alkoxy groups, alkyl mercapto groups, and the like.

A special class of compounds derived from thionophosphinic acids may be obtained by reacting the aforementioned thionophosphinic acid halides or phosphinic acid halides with enol forms of keto- or thioketo-compounds. Without limiting this group of compounds there should be mentioned acetoacetic acid esters, malonic esters, malonic esters amides (or their thionoanalogues), as well as derivatives of these compounds obtained, e.g., by halogen substitution, dihydro-resorcinols, diketo-tetra-hydrofuranes, pyrazolone, as e.g. pyrazolone-(5), 3-methyl-pyrazolone-(5), 1-methyl-pyrazolone-(5), 1-ethyl-5-methyl-pyrazolone-(3), 1-phenyl-pyrazolone-(3), 1-phenyl-5-methyl-pyrazolone-(3), 1-phenyl-4-methyl-pyrazolone-(3), 1-phenyl-4,5-dimethyl-pyrazolone - (3), 3,5 - diketo - pyrazolidines, e.g., 1-methyl-3,5-diketo-pyrazolidine, 1-phenyl-3,5 - diketo - pyrazolidine, 3-ethyl-isoxazolone - (5), 3 - phenyl - isoxazolone (5), imidazolone-(2), 1-phenyl-imidazolone-(2), 4-methyl-2-hydroxythiazole, 4-phenyl - 2 - hydroxythiazole, triazolones, e.g. 1-phenyl-5-hydroxy-1,2,3-triazolone, 1-phenyl - 5 - methyl - 1,2,4 - triazolone - (3), 1 - phenyl-5-propyl-12,4-triazolone-(3), 3-phenyl-1,2,4 - hydroxy - diazolone-(5), 3-methyl-pyrone-(2)-on-(4), 2-methyl-3-hydroxy-γ-pyrone, 4,6 - dimethyl - pyridone - (2), 2,6 - dimethyl-4-hydroxy-pyridine, 3-methyl-pyridazone, 2,4-dimethyl-6-hydroxy-pyrimidine, 5,6-diphenyl - 3 - hydroxy-1,2,4-triazine, 2-methyl-5-hydroxy-1,3,4-hydroxy-diazine, 4-methyl-2-mercapto-thiazole, 1-methyl-2-mercapto - triazole-(1,3,4), 1-phenyl-3-methyl-pyrazole - thion - (5), imidazole-thion-(2), 1-phenyl-imidazole-thion-(2), 2-mercapto-pyridine, 4-mercapto-pyridine, 6-mercapto-4-methyl-pyrimidine, 6-mercapto-2,4-dimethyl-pyrimidine, 6-mercapto-2-methyl-mercapto-pyrimidine.

As it has been said before (for the dithio-compounds) also the thiono-compounds may be prepared especially in the presence of suitable inert solvents and at the same temperature as said above.

Instead of using acid-binding agents for the reaction of phosphinic acid chlorides with phenols and mercaptans there may be used with same or sometimes better advantage the alkali metal alcoholates or mercaptides. Sometimes it may be advantageous to use as an inert solvent an excess of the acid-binding agent. This is especially the case when tertiary amines such as trimethyl amine or dimethyl aniline or quinoline are used.

If thiolphosphinic acid esters are desired phosphinic acid chlorides can be reacted with suitable mercaptans. Here the same mercaptans may be used as mentioned above. The phosphinic acid chlorides are partially known from the literature. A new and very economical way, however, for obtaining these compounds consists in reacting phosphinic acid lower alkyl esters with thionyl chlorides.

Sometimes, however, another way may be more convenient for obtaining thiolphosphinic acid derivatives, i.e., reacting thionophosphinic acids with reactive halides. The thionophosphinic acids (or their salts) react in their tautomeric form to yield thiolo-esters. This reaction may be shown by the following equation:

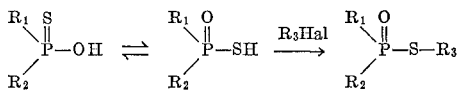

As reactive halogen-containing compounds there may be used the same as described above more detailed. In some cases it is not necessary to isolate the free thionophosphinic acids but to use the crude reaction product obtained from thionophosphinic acid chlorides and an alkali metal hydroxide.

Another method for obtaining the inventive compounds consists in reacting thio- or dithiophosphinic acids with vinyl ethers or thio-ethers. This reaction e.g. may be shown by the following equation:

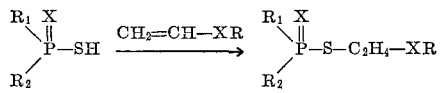

(X=O, S; R=alkyl, aryl). In some cases it is also possible to prepare the inventive compounds stepwise. As a possible method for this reaction there may be mentioned the condensation of chloro-bromo-methane with dithiophosphinic acids. In this reaction only the bromo atom reacts under mild conditions. The remaining chloro atom in the dithiophosphinic acid chloro methyl ester then may react for instance with other mercaptans also, e.g., under more severe conditions with a second molecule of a thio- or dithiophosphinic acid.

There are other special ways for obtaining compounds of the present invention and the two last ways are chosen for illustrating purposes only without limiting this invention in any way.

The compounds of the present invention very effectively kill insects like flies, mites, aphids, etc. They distinguish themselves especially by a good contact-insecticidal activity and mostly also by a systemic action. Sometimes they have an activity on eating insects such as caterpillars. Most surprisingly they are of remarkably low toxicity against mammals. They may be used in the same manner as other known phosphoric insecticides, i.e., in a concentration from about 0.00001% to about 1%, diluted or extended with suitable solid or liquid carriers or diluents. Examples of such solid carriers are talc, chalk, bentonite, clay and the like, as liquid carriers there may be mentioned, water (if necessary with commercial emulsifiers), alcohols, especially lower alcohols such as methanol or ethanol, ketones, especially lower ketones such as acetone or methyl ethyl ketone, liquid hydrocarbons and the like. The new compounds may furthermore be used in combination with each other or with known insecticides, fertilizers, etc.

As an example for the special utility of the inventive compounds the compounds of the following formulae (I) 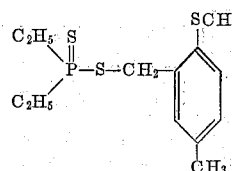

(II) 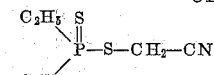

(III) 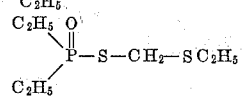

have been tested against spider mites and flies and caterpillars respectively.

Aqueous dilutions of these compounds have been prepared by admixing them with the same amount of an auxiliary solvent (acetone). A commercial emulsifier (benzyl hydroxy diphenyl polyglycol ether) is added in an amount of 20% referred to active ingredient. This premixture then is diluted with water to the desired concentration.

The tests have been carried out as follows: (a) against spider mites. Bean plants (*Phaseolus vulgaris*) of about 15 inches height are sprayed drip wet with solutions prepared as indicated above. The bean plants have been infested heavily with the two-spotted spider (species *Tetranychus telarius*). Evaluation has been carried out after 24 hours, 48 hours and 8 days. The following results have been obtained:

| Compound | Aqueous concentration in percent active ingredient:water | Killing rate in percent |
|---|---|---|
| I | 0.01 | 60 |
| II | (¹) | (¹) |
| III | 0.01 | 100 |

¹ Not tested.

(b) against flies (*Musca domestica*). About 50 flies are placed under covered petri dishes in which drip wet filter paper has been placed which is sprayed drip wet with an insecticidal solution of a concentration as shown below. The living status of the flies has been determined after 24 hours. The following results have been obtained:

| Compound | Aqueous concentration in percent active ingredient:water | Killing rate in percent |
|---|---|---|
| I | (¹) | (¹) |
| II | 0.0001 | 100 |
| III | (¹) | (¹) |

¹ Not tested.

(c) against caterpillars of the type diamond black moth (*Plutella maculipennis*): white cabbage has been sprayed drip wet with aqueous emulsions as prepared above in a concentration as shown below. Caterpillars (10 each) have been placed on the sprayed leaves of the white cabbage. The living status of the caterpillars has been determined after 24 hours and 48 hours. The following results have been obtained:

| Compound | Aqueous concentration in percent active ingredient: water | Killing rate in percent |
|---|---|---|
| I | 0.1 | 100 |
| II | 0.1 | 100 |
| III | 0.1 | 100 |

The following examples are given to illustrate the present invention, but without, however, limiting it thereto:

*Example 1*

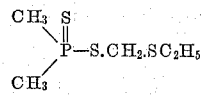

45 g. of dimethyl-thionothiol-phosphinic acid potassium salt (M.P. 130° C.) are dissolved in 200 c.c. of acetonitrile. 28 g. of α-chloromethyl-thioethyl ether are added dropwise at 30–40° C. with stirring. The solution is further stirred at said temperature for one hour. The reaction product is subsequently diluted with 400 cc. of water. The separated oil is taken up in 300 cc. of benzene. The benzene solution is washed several times with cold water and subsequently dried with sodium sulphate. By fractionation there are obtained 40 g. of the new ester of B.P. 83° C./0.01 mm. Hg in the form of a water-insoluble, colourless oil.

*Example 2*

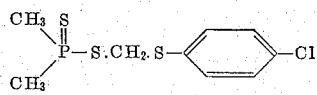

45 g. of dimethyl-thionothiol-phosphinic acid potassium salt are dissolved in 200 cc. of acetronitrile. 48 g. of α-chloromethyl-(4-chlorophenyl)-thioether are added at 40° C. with stirring. The mixture is further stirred at said temperature for one hour and then worked up as described in Example 1. After distillation of the solvent, the residue rapidly solidifies in the form of crystals. 64 g. of a white crystalline product are thus obtained. Yield 89% of the theoretical. The new ester recrystallizes from ligroin in the form of colourless needles of M.P. 60° C.

*Example 3*

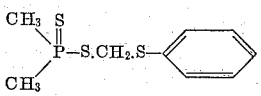

50 g. of dimethyl-thionothiol-phosphinic acid potassium salt are dissolved in 200 cc. of acetonitrile. 40 g. of α-chloromethyl-thiophenyl ether are added at 40° C. with stirring. The mixture is heated to 40° C. for one hour and then worked up as described in Example 1. 55 g. of a pale yellow, water-insoluble oil are thus obtained. Yield 89% of the theoretical. The compound is distillable only with decomposition even under a high vacuum.

*Example 4*

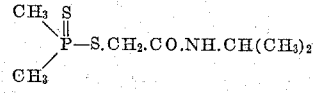

45 g. of dimethyl-thionothiol-phosphinic acid potassium salt are dissolved in 200 cc. of acetonitrile. 34 g. of chloro-acetic acid-isopropylamide are added at 40° C. with stirring. Stirring is continued at 40° C. for two hours and the potassium chloride formed is filtered off with suction. The filtrate is diluted with 200 cc. of benzene and shaken several times with water. When the benzene solution is dried over sodium sulphate, the solvent is distilled off. 49 g. of the new ester are obtained in the form of a pale yellow oil which is poorly soluble in water and distillable only with decomposition even under a high vacuum. Yield 87% of the theoretical.

*Example 5*

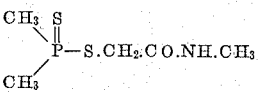

45 g. of dimethyl-thionothiol-phosphinic acid potassium salt are dissolved in 200 cc. of acetonitrile. 27 g. of chloro-acetic acid-methylamide are added at 40° C. with stirring. The mixture is stirred for two hours and worked up as described in Example 4. 44 g. of the new ester are thus obtained in the form of a water-insoluble, yellow oil. Yield 89% of the theoretical.

*Example 6*

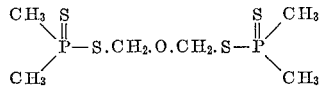

90 g. of dimethyl-thionothiol-phosphinic acid potassium salt are dissolved in 200 cc. of acetonitrile. 30 g. of α,α′-dichloromethyl ether are added at 40° C. with stirring. Stirring is continued at said temperature for one hour and the reaction product is then diluted with 300 cc. of ice water. The separated oil is taken up in 200 cc. of benzene, washed several times with ice water and then dried over sodium sulphate. After removal of the solvent, there remains an oily residue which rapidly solidifies in crystalline form. 33 g. of a white crystalline product are thus obtained. Yield 45% of the theoretical. From a mixture of acetic acid/ligroin the new compound recrystallises in the form of colourless needles of M.P. 130° C.

*Example 7*

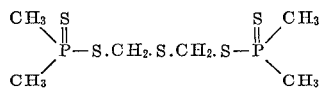

90 g. of dimethyl-thionothiol-phosphinic acid potassium salt are dissolved in 200 cc. of acetonitrile. 33 g. of α,α′-dichloromethyl-thioether are added at 60° C. with stirring. The mixture is kept at 60° C. for two hours and then worked up as described in Example 6. 51 g. of a white crystalline product are thus obtained. Yield 66% of the theoretical. From acetic acid/ligroin the new compound recrystallises in the form of colourless needles of M.P. 88° C.

*Example 8*

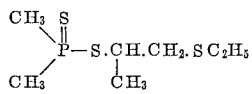

45 g. of dimethyl-thionothiol-phosphinic acid potassium salt are dissolved in 200 cc. of acetonitrile. 35 g. of α-chloro-isopropyl-thioethyl ether (B.P. 56° C./13 mm. Hg) are added at 50° C. with stirring. Stirring is continued at 50° C. for a further two hours, and the reaction product is then diluted with 300 cc. of ice water. The separated oil is taken up in 300 cc. of benzene. The benzene layer is washed several times with ice water and subsequently dried over sodium sulphate. After fractionation, 48 g. of the new ester are obtained in the form of a colourless, water-insoluble oil of B.P. 89° C./0.01 mm. Hg. Yield 84% of the theoretical.

*Example 9*

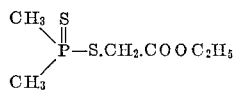

45 g. of dimethyl-thionothiol-phosphinic acid potassium salt are dissolved in 200 cc. of acetonitrile. 32 g. of monochloro-acetic acid ethyl ester are added at 45° C. with stirring. Stirring is continued at said temperature for a further hour and the product is worked up in conventional manner. 42 g. of the new ester are thus obtained in the form of a colourless, water-insoluble oil of B.P. 75° C./0.01 mm. Hg. Yield 79% of the theoretical.

*Example 10*

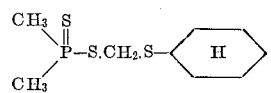

45 g. of dimethyl-thionothiol-phosphinic acid potassium salt are dissolved in 200 cc. of acetonitrile. 42 g. of α-chloromethyl-thiocyclohexyl ether (B.P. 65° C./1 mm. Hg) are added at 45° C. with stirring. The mixture is stirred at said temperature for a further hour and then worked up in usual manner. 56 g. of a pale yellow, water-insoluble oil are thus obtained. Yield 88% of the theoretical. The new ester is distillable only with decomposition even under a high vacuum.

*Example 11*

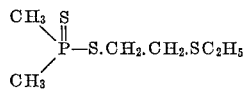

45 g. of dimethyl-thionothiol-phosphinic acid potassium salt are dissolved in 200 cc. of acetonitrile. 32 g. of β-chlorethyl-thioethyl ether are added at 50° C. with stirring. The mixture is kept at 50° C. for two hours and then worked up in usual manner. 47 g. of the new ester of B.P. 87° C./0.01 mm. Hg are thus obtained in the form of a colourless, water-insoluble oil. Yield 88% of the theoretical.

*Example 12*

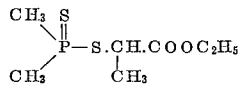

45 g. of dimethyl-thionothiol-phosphinic acid potassium salt are dissolved in 200 cc. of acetonitrile. 46 g. of α-bromo-propionic acid ethyl ester are added at 40° C. with stirring. The mixture is stirred at 40° C. for a further hour and then worked up in usual manner. 43 g. of the new ester are thus obtained in the form of a colourless, water-insoluble oil going over at 78° C. and under a pressure of 0.01 mm. Hg. Yield 76% of the theoretical. After a short time, the ester solidifies. After recrystallisation from ligroin, colourless prisms of M.P. 50° C. are obtained.

*Example 13*

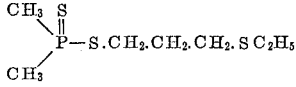

45 g. of dimethyl-thionothiol-phosphinic acid potassium salt are dissolved in 200 cc. of acetonitrile. 47 g. of γ-bromopropyl-thioethyl ether (B.P. 78° C./12 mm. Hg) are added at 60° C. with stirring. The mixture is kept at 60° C. for a further two hours and then worked up in the usual manner. 30 g. of the new ester of B.P. 94° C./0.01 mm. Hg are thus obtained as a colourless, water-insoluble oil. Yield 53% of the theoretical.

*Example 14*

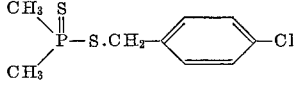

45 g. of dimethyl-thionothiol-phosphinic acid potassium salt are dissolved in 200 cc. of acetonitrile. 42 g. of p-chlorobenzyl chloride are added at 60° C. with stirring. The mixture is kept at 60° C. for two hours and worked up in usual manner. 51 g. of the new ester are obtained. Yield 81% of the theoretical. The ester recrystallises from ligroin in the form of colourless needles of M.P. 62° C.

*Example 15*

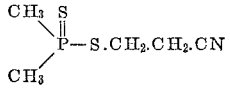

45 g. of dimethyl-thionothiol-phosphinic acid potassium salt are dissolved in 200 cc. of acetonitrile. 24 g. of β-chloro-propionic acid nitrile are added at 60° C. with stirring. The mixture is kept at 60° C. for two hours and is then worked up in the usual manner. 32 g. of a colourless, water-insoluble oil of B.P. 89° C./0.01 mm. Hg are thus obtained. Yield 72% of the theoretical.

*Example 16*

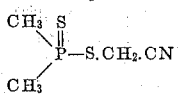

45 g. of dimethyl-thionothiol-phosphinic acid potassium salt are dissolved in 200 cc. of acetonitrile. 20 g. of chloro-acetonitrile are added at 60° C. with stirring. The mixture is kept at 60° C. for two hours and then worked up in usual manner. 31 g. of the new ester of B.P. 78° C./0.01 mm. Hg are obtained in the form of a water-insoluble, colourless oil. Yield 76% of the theoretical.

*Example 17*

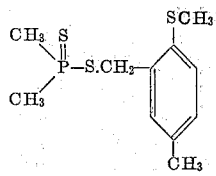

45 g. of dimethyl-thionothiol-phosphinic acid potassium salt are dissolved in 200 cc. of acetonitrile. 47 g. of 2-chloromethyl-4-methyl-thioanisole (B.P. 95° C./1 mm. Hg; M.P. 33° C.) are added at 60° C. with stirring. The mixture is kept at 60° C. for two hours and is then worked up in usual manner. 66 g. of a pale yellow, water-insoluble product are obtained which is distillable only with decomposition even under a high vacuum. Yield 95% of the theoretical; M.P. 51° C.

*Example 18*

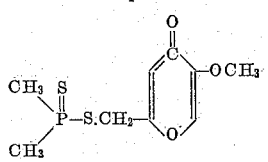

39.5 g. (0.24 mol.) of dimethyl-thionothiol-phosphinic acid potassium salt are dissolved in 200 cc. of acetone. To this solution there are added with stirring 32.5 g. (0.2 mol.) of 2-chloromethyl-5-methoxy-4-pyrone (M.P. 118° C.; cf. J. Org. Chem., 15 [1950], page 223). The potassium chloride separates instantaneously with an exothermic reaction. The product is heated to 50° C. for a further hour, and the potassium chloride thus formed is filtered off with suction. 300 cc. of ice water are then added to the filtrate. The new ester precipitates thereby as a crystalline product. The crystalline substance is filtered off with suction and dried on clay. In this way 48 g. of a colourless, crystalline powder are obtained. Yield 90.7% of the theoretical. After recrystallisation from hot water, the ester shows a sharp melting point of 126° C.

*Example 19*

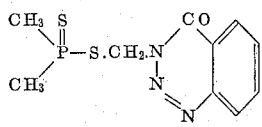

20 g. (0.1 mol.) of dimethyl-thionothiol-phosphinic acid potassium salt are dissolved in 200 cc. of acetone. 19 g. (0.1 mol.) of N-chloromethyl-benzazimide are added with stirring. The mixture is subsequently heated to 50° C. with stirring for one hour. The reaction product is introduced with stirring into 900 cc. of water. The crystalline reaction product thus formed precipitates and is filtered off with suction. Upon recrystallisation from ten times its amount of acetonitrile, the new ester shows a sharp melting point of 166° C. 24 g. of the recrystallised product are obtained corresponding to a yield of 84.3% of the theoretical.

*Example 20*

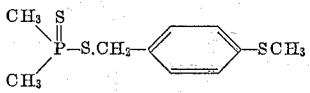

39.5 g. (0.24 mol) of dimethyl-thionothiol-phosphinic acid potassium salt are dissolved in 150 cc. of acetone. 35 g. (0.2 mol) of 4-methyl-mercapto-benzyl chloride (B.P. 97° C./2 mm. Hg) are added dropwise with stirring at 20° C. The mixture is subsequently heated to 50° C. with stirring for a further hour, then cooled to room temperature and the reaction product is poured into 400 cc. of ice water. The separated oil is taken up in 200 cc. of benzene. The benzene solution is washed with a 4% sodium bicarbonate solution and subsequently dried over sodium sulphate. Upon fractionation of the filtrate, 50 g. of the new ester are obtained as a colourless, water-insoluble oil of B.P. 112° C./0.01 mm. Hg. Yield 91.5% of the theoretical.

*Example 21*

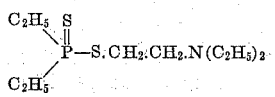

50 g. (0.25 mol) of diethyl-thionothiol-phosphinic acid potassium salt are suspended in 200 cc. of acetonitrile. 37.5 g. (0.25 mol) of diethylamino-ethyl chloride are added at 60° C. with stirring, and stirring is continued at 60° C. for one hour. The reaction product is subsequently introduced into 200 cc. of ice water and taken up with 300 cc. of benzene. The benzene solution is dried and fractionated. In this way 47 g. of the new ester of B.P. 90° C./0.01 mm. Hg are obtained in the form of a colourless, poorly water-soluble oil. Yield 74% of the theoretical. The ester shows on rats per os a mean toxicity of 5 mg./kg.

*Example 22*

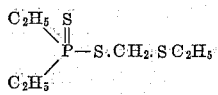

50 g. (0.25 mol) of diethylthionothiol-phosphinic acid potassium salt are suspended in 200 cc. of acetonitrile. 28 g. (0.25 mol) of α-mercaptomethyl-thioethyl ether are added at 30° C. with stirring. The mixture is stirred at 30° C. for a further hour and then worked up as described in Example 21. 47 g. of the new ester are obtained as a colourless, water-insoluble oil of B.P. 82° C./0.01 mm. Hg. Yield 82% of the theoretical. The ester shows on rats per os a mean toxicity of 25 mg./kg.

*Example 23*

In a similar manner there is obtained from 50 g. of diethylthionothiol-phosphinic acid potassium salt and 32 g. of β-chlorethyl-thioethyl ether 55 g. of the following compound

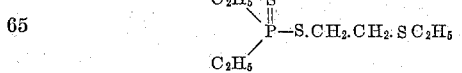

of B.P. 96° C./0.01 mm. Hg. Yield 91% of the theoretical. (Water-insoluble, colourless oil. Mean toxicity on rats per os 25 mg./kg.)

*Example 24*

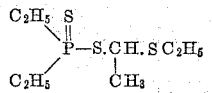

50 g. (0.25 mol) of diethylthionothiol-phosphinic acid potassium salt are dissolved in 200 cc. of acetonitrile. 32 g. (0.25 mol) of α-chlorethyl-thioethyl ether (B.P. 33° C./15 mm. Hg) are added at 20° C. with stirring. The mixture is stirred at room temperature for a further hour and then worked up in known manner. 50 g. of the new ester are obtained in the form of a colourless, water-insoluble oil of B.P. 97° C./0.01 mm. Hg. Yield 79% of the theoretical.

*Example 25*

In an analogous manner there are obtained from 50 g. of diethylthionothiol-phosphinic acid potassium salt and 46 g. of α-bromopropionic acid ethyl ester 52 g. of an ester of the following composition

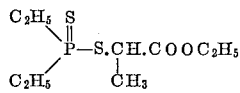

as a colourless, scarcely water-soluble oil of B.P. 93° C./0.01 mm. Hg. Yield 82% of the theoretical.

*Example 26*

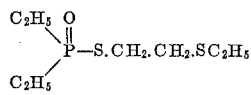

70 g. of diethylthiolphosphonic acid are added with stirring to a potassium hydroxide solution of 30 g. of anhydrous potassium hydroxide in 150 cc. of anhydrous alcohol. 63 g. of β-chlorethyl-thioethyl ether are added dropwise at 50–60° C. with stirring. The mixture is kept at 50° C. for one hour, then cooled and run into 300 cc. of ice water. The precipitated oil is taken up with 200 cc. of benzene, de-acidified with a 4% bicarbonate solution, dried and fractionated. 75 g. of the new ester of B.P. 88° C./0.01 mm. Hg are thus obtained. Yield 66% of the theoretical.

*Example 27*

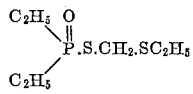

70 g. of diethylthiolphosphinic acid are dissolved in 150 cc. of anhydrous alcohol. 30 g. of potassium hydroxide have previously been dissolved in this alcohol. There are added dropwise with stirring at 30° C. 56 g. of α-chloromethylthioethyl ether. The temperature is maintained at 30° C. for one hour, the reaction product then introduced into 300 cc. of ice water and the oil thus formed is stirred with 200 cc. of benzene. After drying and fractionating of the benzene solution, 55 g. of the new ester are obtained. The ester goes over at 76° C. under a pressure of 0.01 mm. Hg in the form of a colourless, water-insoluble oil. Yield 52% of the theoretical.

*Example 28*

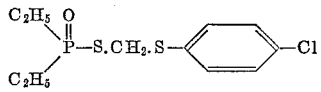

30 g. of potassium hydroxide are dissolved in 150 cc. of anhydrous alcohol. 70 g. of diethyl-thiolphosphinic acid are added to this solution with stirring. 97 g. of α-chloromethyl-(4-chlorophenyl)-thioether are then added dropwise with stirring at 40° C. The mixture is further stirred at 40° C. for one hour and then introduced into 300 cc. of ice water and taken up in benzene. After drying of the benzene solution, the solvent is removed. The residue is kept under a high vacuum at a bath temperature of 70° C. until the pressure is 0.01 mm. Hg. In this way 118 g. of the new ester are obtained in the form of a pale yellow, water-insoluble oil. Yield 82% of the theoretical.

*Example 29*

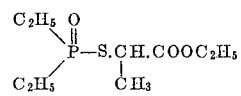

30 g. of potassium hydroxide are dissolved in 150 cc. of anhydrous alcohol. 70 g. of diethylthiolphosphinic acid are then added with stirring. 92 g. of α-bromopropionic acid ethyl ester are then added dropwise at 30–40° C. Stirring is continued for a further hour and the product worked up in usual manner. 67 g. of the new ester of B.P. 80° C./0.01 mm. Hg are obtained. Yield 56% of the theoretical. The new ester is a colourless, scarcely water-soluble oil.

*Example 30*

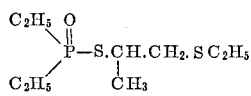

30 g. of potassium hydroxide are dissolved in 150 cc. of anhydrous alcohol. 70 g. of diethylthiolphosphinic acid are added to this solution. 70 g. of α-chloro-isopropylthioethyl ether (B.P. 56° C./13 mm. Hg) are subsequently added dropwise with stirring at 60° C. The mixture is kept at 50° C. for a further 2 hours and then worked up in usual manner. 53 g. of the new ester of B.P. 92° C./0.01 mm. Hg are obtained. Yield 44% of the theoretical.

*Example 31*

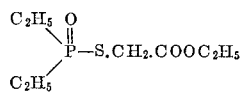

30 g. of potassium hydroxide are dissolved in 150 cc. of anhydrous alcohol. 70 g. of diethylthiolphosphinic acid are added. 62 g. of monochloro-acetic acid ethyl ester are subsequently added dropwise at 45° C. The mixture is stirred for a further hour at 45° C. and then worked up in usual manner. 40 g. of the new ester are obtained as a colourless, water-insoluble oil of B.P. 70° C./0.01 mm. Hg. Yield 36% of the theoretical.

In the following there are given some biological activities of a number of the foregoing compounds. In some cases the toxicity on rats (either the mean toxicity $LD_{50}$ or the total toxicity $LD_{95}$) has been listed, too.

EXAMPLE 1

Rats per os $LD_{50}$, 25 mg./kg.
| | | |
|---|---|---|
| Flies | 0.001% | 100% |
| Spider mites | 0.01% | 90% |
| Syst. action/ Aphids | 0.1% | 100% |
| Caterpillars | 0.1% | 100% |

EXAMPLE 2

Rats per os $LD_{50}$, 1000 mg./kg.

EXAMPLE 3

Rats per os $LD_{95}$, 250 mg./kg.
| | | |
|---|---|---|
| Aphids | 0.01% | 100% |
| Spider mites | 0.1% | 100% |
| | (ovicidal action) | |
| Systemic action/ Aphids | 0.1% | 100% |

EXAMPLE 4

Rats per os $LD_{50}$, 500 mg./kg.
| | | |
|---|---|---|
| Aphids | 0.1% | 100% |
| Spider mites | 0.01% | 70% |
| Systemic action/ Aphids | 0.1% | 100% |

EXAMPLE 5
Rats per os LD$_{95}$, 250 mg./kg.
Aphids _____ 0.1% 100%
Spider mites _____ 0.01% 70%
Systemic action/
Aphids _____ 0.1% 100%

EXAMPLE 6
Rats per os LD$_{50}$, 1000 mg./kg.

EXAMPLE 7
Rats per os LD$_{50}$, 50 mg./kg.
Spider mites _____ 0.1% 100%

EXAMPLE 8
Rats per os LD$_{50}$, 100 mg./kg.
Aphids _____ 0.1% 100%
Spider mites _____ 0.01% 80%
Systemic action/
Aphids _____ 0.1% 100%

EXAMPLE 9
Rats per os 1000 mg./kg. do not show any symptoms.
Flies _____ 0.01% 100%

EXAMPLE 10
Rats per os LD$_{50}$, 25 mg./kg.
Flies _____ 0.01% 100%
Spider mites _____ 0.01% 85%

EXAMPLE 11
Rats per os LD$_{50}$, 25 mg./kg.
Aphids _____ 0.1% 100%
Spider mites _____ 0.01% 100%
Systemic action/
Aphids _____ 0.1% 100%

EXAMPLE 12
Rats per os 1000 mg./kg. do not show any symptoms.
Flies _____ 0.01% 100%
Caterpillars _____ 0.1% 100%

EXAMPLE 13
Rats per os LD$_{95}$, 250 mg./kg.
Spider mites _____ 0.1% 100%
(ovicidal action)
Systemic action/
Aphids _____ 0.1% 100%

EXAMPLE 14
Rats per os 1000 mg./kg. do not show any symptoms.
Spider mites _____ ovicidal action

EXAMPLE 15
Rats per os LD$_{50}$, 250 mg./kg.
Spider mites _____ 0.1% 100%
Systemic action/
Aphids _____ 0.1% 100%

EXAMPLE 16
Rats per os LD$_{50}$, 250 mg./kg.
Systemic action/
Aphids _____ 0.1% 100%

EXAMPLE 17
Rats per os LD$_{50}$, 250 mg./kg.
Spider mites _____ 0.001% 50%
(ovicidal action)
Aphids _____ 0.01% 80%

EXAMPLE 18
Rats per os LD$_{50}$, 500 mg./kg.
Spider mites _____ 0.1% 100%
Systemic action/
Aphids _____ 0.1% 100%

EXAMPLE 19
Rats per os 1000 mg./kg. do not show any symptoms.

EXAMPLE 20
Rats per os LD$_{95}$, 500 mg./kg.
Aphids _____ 0.1% 100%
Spider mites _____ 0.001% 50%
(ovicidal action)

EXAMPLE 21
Aphids _____ 0.01% 100%
Spider mites _____ 0.1% 100%
(ovicidal action)
Systemic action/
Aphids _____ 0.1% 100%

EXAMPLE 22
Flies _____ 0.001% 100%
Aphids _____ 0.01% 100%
Spider mites _____ 0.001% 90%
Caterpillars _____ 0.1% 100%
Systemic action/
Aphids _____ 0.1% 100%

EXAMPLE 23
Flies _____ 0.001% 50%
Aphids _____ 0.01% 50%
Spider mites _____ 0.01% 90%
(ovicidal action)
Systemic action/
Aphids _____ 0.1% 100%

EXAMPLE 24
Rats per os LD$_{50}$, 50 mg./kg.
Aphids _____ 0.1% 100%
Spider mites _____ 0.1% 100%
(ovicidal action)
Caterpillars _____ 0.1% 100%

EXAMPLE 25
Rats per os LD$_{50}$, 100 mg./kg.
Flies _____ 0.001% 100%
Aphids _____ 0.1% 100%
Caterpillars _____ 0.1% 100%

EXAMPLE 26
Rats per os LD$_{95}$, 25 mg./kg.
Aphids _____ 0.01% 100%
Spider mites res. _____ 0.01% 100%
(ovicidal action)
Systemic action/
Aphids _____ 0.1% 100%

EXAMPLE 27
Rats per os LD$_{50}$, 10 mg./kg.
Aphids _____ 0.001% 90%
Spider mites _____ 0.01% 100%
Systemic action/
Aphids _____ 0.1% 100%
Caterpillars _____ 0.1% 100%

EXAMPLE 28
Rats per os LD$_{50}$, 100 mg./kg.
Aphids _____ 0.01% 50%
Spider mites _____ 0.01% 90%
(ovicidal action)
Systemic action/
Aphids _____ 0.1% 100%

EXAMPLE 29
Rats per os LD$_{50}$, 10 mg./kg.
Aphids _____ 0.1% 100%
Spider mites _____ 0.01% 100%
Systemic action/
Aphids _____ 0.1% 100%
Caterpillars _____ 0.1% 100%

EXAMPLE 30

Rats per os LD$_{50}$, 25 mg./kg.

| | | |
|---|---|---|
| Aphids | 0.01% | 80% |
| Spider mites | 0.1% | 100% |
| Systemic action/ | | |
| Aphids | 0.1% | 100% |

EXAMPLE 31

Rats per os LD$_{50}$, 50 mg./kg.

| | | |
|---|---|---|
| Aphids | 0.01% | 50% |
| Systemic action/ | | |
| Aphids | 0.1% | 100% |
| Caterpillars | 0.1% | 100% |

*Example 32*

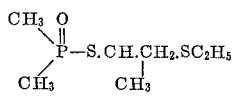

32 g. of dimethyl-thiol-phosphinic acid ammonium salt (0.25 mol) are dissolved in 100 cc. of ethyl alcohol. 35 g. of α-chloro-isopropyl-thioethyl ether (B.P. 56° C./13 mm. Hg) are added dropwise at 70° C. with stirring. Stirring is continued at 70° C. for a further 2 hours and the reaction product is subsequently taken up in 1 litre of benzene. The separated ammonium salt is filtered off with suction. By fractionation 47 g. of the new ester of B.P. 94° C./0.01 mm. Hg are obtained. Yield 89% of the theoretical. The ester is soluble in water.

The new ester shows on rats per os a mean toxicity of 10 mg./kg.

*Example 33*

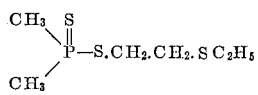

32 g. (0.25 mol) of dimethyl-thionothiol-phosphinic acid ammonium salt (M.P. 170° C.) are dissolved in 100 cc. of methanol. 42 g. (0.25 mol) of β-bromethyl-thioethyl ether are added at 35° C. with stirring. The mixture is stirred at 50° C. for one hour and the reaction product is then taken up with 1000 cc. of benzene. The separated ammonium chloride is filtered off. The benzene layer is washed with 10 cc. of water. After drying of the benzene, the product is fractionated. In this way 45 g. of the new ester of B.P. 83° C./0.01 mm. Hg are obtained. Yield 91% of the theoretical. The ester is a colourless, water-soluble oil.

The ester shows on rats per os a mean toxicity of 2.5 mg./kg.

*Example 34*

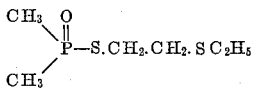

32 g. (0.25 mol) of dimethyl-thiolphosphinic acid ammonium salt are dissolved in 100 cc. of methanol. 32 g. (0.25 mol) of β-chlorethyl-thioethyl ether are added at 70° C. with stirring. The mixture is stirred at 70–80° C. for a further 2 hours and then worked up as described in the preceding example. 44 g. of the new ester of B.P. 83° C./0.01 mm. Hg are obtained. Yield 89% of the theoretical.

*Example 35*

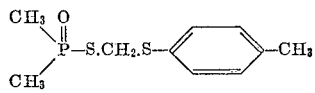

32 g. (0.25 mol) of dimethyl-thiolphosphinic acid ammonium salt are dissolved in 100 cc. of methanol. 44 g. (0.25 mol) of α-chloromethyl-4-thiocresyl ether are added at 40° C. with stirring. The temperature is raised to 50° C. for 2 hours, the reaction product is then taken up with 300 cc. of benzene and washed with 100 cc. of water. After drying the benzene solution with sodium sulphate, the solvent is evaporated off. The residue solidifies in crystals. Dried on clay, the white needles show a M.P. of 68° C. 44 g. of the new ester are obtained. Yield 72% of the theoretical.

The ester shows on rats per os a mean toxicity of 100 mg./kg.

*Example 36*

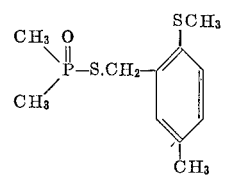

32 g. (0.25 mol) of dimethyl-thiolphosphinic acid ammonium salt are dissolved in 100 cc. of anhydrous alcohol. 47 g. (0.25 mol) of (2)-α-chloromethyl-1,4-thiocresyl-methyl ether are added at 80° C. with stirring. The mixture is kept at 80° C. for 2 hours, then cooled to room temperature and taken up with 500 cc. of benzene. The benzene solution is washed with 100 cc. of water and subsequently dried with sodium sulphate. Upon distillation of the solvent, 46 g. of the new ester are obtained. The ester recrystallises from equal parts of ligroin/acetyl acetate giving colourless needles of M.P. 98° C.

On rats per os, medium toxicity 25 mg./kg.

*Example 37*

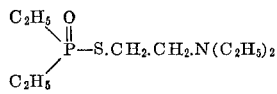

34.6 g. (0.25 mol) of diethyl-thiolphosphinic acid are dissolved in 50 cc. of ethanol. A solution of 14.1 g. (0.25 mol) of potassium hydroxides in 100 cc. of ethanol are added dropwise with stirring. 34 g. (0.25 mol) of diethylamino-ethyl chloride are subsequently added at 50° C. with further stirring. The reaction is continued at 50° C. for a further half hour and the product is then cooled to room temperature. The separated potassium chloride is subsequently filtered off with suction. The filtrate is freed from the solvent in vacuo. The residue obtained is taken up in 200 cc. of chloroform and subsequently washed with 50 cc. of water. After drying of the chloroform solution, the product is fractionated. 47.4 g. of diethylthiolphosphinic acid-N-diethyl-amino-ethyl ester of B.P. 81° C./0.02 mm. Hg are obtained. Yield 80% of the theoretical. The ester is a colourless, partially water-soluble liquid.

Aphides are killed to 70% with 0.001% solutions. 0.01% solutions kill resistant spider mites to 100%. The preparation has a 100% systemic action upon aphides at 0.1% concentrations. Caterpillars are also completely killed with 0.1% solutions.

*Example 38*

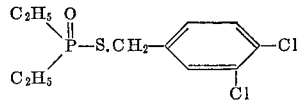

41.5 g. (0.3 mol) of diethyl-thiolphosphinic acid are dissolved in 100 cc. of ethanol. A solution of 16.8 g. (0.3 mol) of potassium chloride in 150 cc. of ethanol is added. 58.7 g. (0.3 mol) of 3,4-dichlorobenzyl chloride are then added at 40° C. with stirring. The reaction product is kept at 60° C. for 1½ hours. It is then cooled to room temperature and the potassium chloride formed is filtered off with suction. It is worked up as described in the preceding example, and 65 g. of diethyl-thiolphosphinic acid 3,4-dichlorobenzyl ester of B.P. 117° C./0.01 mm. Hg are obtained. Yield 73% of the theoretical. The new ester is a colourless, scarcely water-soluble oil.

The ester shows on rats per os a mean toxicity of 500 mg./kg.

Example 39

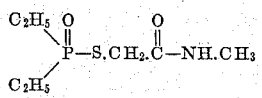

31.1 g. (0.2 mol) of diethyl-thiolphosphinic acid ammonium salt are dissolved in 120 cc. of water. 21.7 g. (0.2 mol) of α-chloro-N-methyl-acetamide are added with stirring. The reaction product is heated to 65° C. with stirring for 1½ hours, then cooled to room temperature and saturated with sodium sulphate. The reaction product is subsequently extracted three times each time with 100 cc. of chloroform. The resultant chloroform solution is shaken with 10 cc. of water and subsequently dried with sodium sulphate. After distilling off the solvent, the residue solidifies in crystals. 36 g. of the new ester are obtained. Yield 80% of the theoretical. From the benzene/petroleum ether mixture the ester is obtained as colourless needles of M.P. 80° C. The ester is water-soluble. The ester shows on rats per os a toxicity of 5 mg./kg.

Example 40

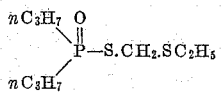

20.4 g. (0.1 mol) of di-n-propyl-thiolphosphinic acid potassium salt are dissolved in 40 cc. of water. 11 g. (0.1 mol) of α-chloromethyl-ethyl sulphide are added at 40° C. with stirring. Stirring is continued at 40° C. for half hour and the separated oil is taken up in chloroform. The chloroform solution is separated, shaken with a little water and subsequently dried with sodium sulphate. After distilling off the solvent, a pale yellow oil remains which is kept at a bath temperature of 100° C. for a short time under a pressure of 1 mm. Hg. In this way 18.1 g. of the new ester are obtained. Yield 75% of the theoretical. The ester shows on rats per os a toxicity of 2.5 mg./kg.

Example 41

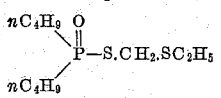

46.2 g. (0.2 mol) of di-n-butylthiolphosphinic acid potassium salt are dissolved in 65 cc. of water. 22 g. (0.2 mol) of α-chloromethyl-ethyl sulphide are added with stirring. The mixture is heated to 40° C. for a half hour, then cooled to room temperature and the separated oil is taken up in chloroform. The chloroform solution thus obtained is shaken twice, each time with 20 cc. of water. After separating and drying the chloroform solution with sodium sulphate, the solvent is removed in a vacuum. The residue formed is kept for a short time at a bath temperature of 100° C. under a pressure of 1 mm. Hg. In this way, 42 g. of the new ester are obtained in the form of a yellow, scarcely water-soluble oil. Yield 78% of the theoretical.

The new ester shows on rats per os a mean toxicity of 20 mg./kg.

Example 42

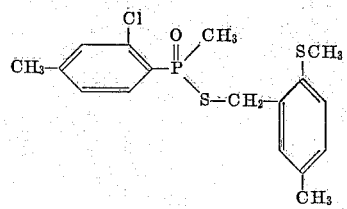

56 grams of the potassium salt of 4-methyl-2-chloro-phenyl methyl thiolphosphinic acid are dissolved in 60 ml. of methanol. At 70° C. there are added while stirring 47 grams of 2-chloromethyl-4-methyl-thioanisole. The temperature is kept for 1 hour at 70° C. The mixture then is cooled at room temperature, and the whole mixture is poured into 200 ml. of ice water. The oily layer which separates is taken up in 200 ml. of benzene, the benzenic layer is washed twice with water and then dried over anhydrous sodium sulfate. After distilling off the solvent the remaining thick yellow oil is kept for 1 hour on the water bath at 70° C. at 1 mm. Hg to remove last traces of solvent. The new ester thus obtained amounts to 73 grams, i.e., 77% of the theoretical. The compound cannot be distilled even in high vacuo.

Example 43

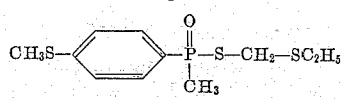

44 grams of p-methyl-mercapto-phenyl-methyl-thiolphosphinic acid are dissolved in 50 ml. of methanol containing 12 grams of potassium hydroxide. While stirring there are added 22 grams of α-methyl-mercapto-thiomethyl ether. Stirring is continued for 1 further hour. The reaction mixture then is poured into 200 ml. of ice water, and the oil which separates is taken up in 300 ml. of benzene. The benzenic layer is washed neutral with 50 ml. of water twice, and then dried over sodium sulfate (anhydrous). After distilling off the solvent in vacuum, there are obtained 30 grams of the new ester as a yellow water-unsoluble oil which is not distillable in high vacuum. The yield amounts to 51% of the theoretical. The toxicity $LD_{50}$ on rats per os is 50 mg./kg.

Example 44

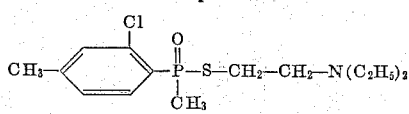

56 grams of 4-methyl-2-chlorophenyl-methyl-thiolphosphinic acid are dissolved in 60 ml. of methanol containing 15 grams of potassium hydroxide. At 70° C. there are added while stirring 35 grams of β-chloro-ethyl-diethylamine. After working up the reaction mixture as described in the foregoing example there are obtained 47 grams of the new ester as a water-unsoluble high vacuum undistillable oil, i.e., 59% of the theoretical. The $LD_{50}$ on rats per os is 100 mg./kg.

Example 45

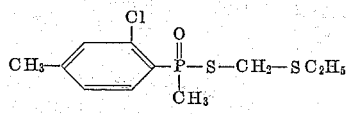

56 grams of 4-methyl-2-chlorophenyl-methyl-thiolphosphinic acid are dissolved in 60 ml. of methanol containing 15 grams of potassium hydroxide. While stirring there are added at 50° C. 28 grams of α-methyl-mercapto-ethyl thio-ether. The mixture is stirred for 1 further hour and then worked up as described before. The ester which is obtained in an amount of 48 grams (65% of the theoretical) consists of a water-insoluble and not distillable oil. The toxicity on rats per os $LD_{50}$ is 25 mg./kg.

Example 46

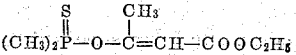

5 grams of sodium finely powdered and suspended in 150 ml. of benzene are converted into the ethylate by 11 grams of anhydrous ethanol which is added dropwise. The fresh sodium alcoholate in benzene is reacted immediately with 26 grams of aceto acetic acid ester until the sodium is completely disappeared. While stirring there are added 27 grams of dimethyl-thiophosphinic acid chloride and the reaction is completed while stirring for further 30 minutes at 60° C.; after cooling down there are added 5 to 10 ml. of water for precipitating the sodium chloride. The organic layer is poured off and the solvent is removed by distillation. The remaining ester of the above formula may be purified by fractionated distillation. It boils at 0.01 mm. Hg between 60–61° C. and crystallizes when cooled down. The recrystallized ester melts at 58–60° C. Yield 39 grams, i.e., 87.8% of the theoretical. Toxicity on rats per os $LD_{95}$ 100 mg./kg.

*Example 47*

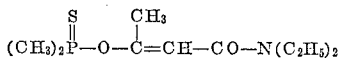

5 grams of sodium in 415 ml. of benzene are treated with 11 grams of anhydrous ethanol, and 32 grams of aceto-acetic acid diethyl amide as described in the foregoing example. While cooling there are added at about 30–40° C. 27 grams of dimethyl-thiophosphinic acid chloride. The reaction mixture is stirred over night. After precipitating the sodium chloride the organic layer is separated off by decantation. After distilling off the solvent it may be purified by the distillation. At 0.01 mm. Hg it distills at 80° C. The light yellow water-unsoluble oil which is obtained amounts to 42 grams i.e. 84% of the theoretical. Toxicity on rats per os $LD_{95}$ 25 mg./kg.

*Example 48*

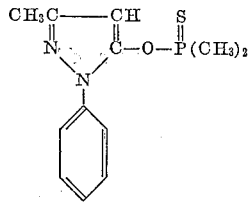

35 grams of N-phenyl-3-methylpyrazolone are dissolved in 17 ml. of pyridine. At a temperature to above 50° C. there are added while cooling the mixture 27 grams of dimethyl-thiophosphinic acid chloride; after the reaction is completed there are added 100 ml. of water and the mixture is filtrated with suction. The crystals are washed twice with water and re-crystallized from benzene-petrol ether. The above shown compound melts at 78° C. The yield amounts to 49 grams, i.e., 92.3% of the theoretical. The toxicity on rats per os is above 1000 mg./kg.

*Example 49*

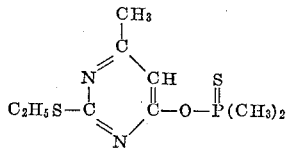

34 grams of 2-ethylmercapto-4-methyl-6-hydroxy-pyrimidine are dissolved in 70 ml. of pyridine and at 30° C. there are added while cooling 27 grams of dimethyl-thiolphosphinic acid chloride. The reaction mixture is poured into water and the water-insoluble oil is taken up in benzene; the benzenic layer is washed twice with small amounts of diluted hydrochloric acid, and at last with water. After drying over anhydrous sodium sulfate the solvent is distilled off. The remainder solidifies and after re-crystallizing from benzene it melts at 56 to 57° C. Yield 42 grams, i.e., 83% of the theoretical. Toxicity on rats per os 1000 mg./kg.

*Example 50*

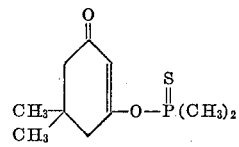

28 grams of 5,5-dimethyl-dihydroresorcinol are dissolved in 200 ml. of methyl-ethyl ketone. There are added 56 grams finely divided potassium carbonate and while stirring the mixture is heated at 60 to 70° C. After cooling down to 20 to 30° C. there are added 27 grams of dimethyl thiophosphinic acid chloride. Stirring is continued for a few minutes and the reaction mixture then is poured into water. The oil which precipitates soon solidifies and can be removed by filtration with suction. M.P. 90° C. (from benzene). Yield 35 grams (36% of the theoretical). Toxicity on rats per os 1000 mg./kg.

*Example 51*

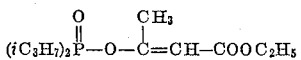

A solution of sodium-acetic acid ethyl ester (prepared from 32.5 grams of aceto-acetic acid, 6 grams of sodium and 12.5 grams of ethanol) in 300 ml. of benzene is treated dropwise at 60 to 70° C. with 42.5 grams of diisopropylphosphinic acid chloride. The mixture is stirred for 2 hours at 60–70° C. and then 15 ml. of water are added to solidify the sodium chloride. The organic layer is poured off and after drying the benzene over anhydrous sodium sulfate the solvent is removed by distillation. The above ester distils at 3 mm. at 146 to 147° C. It is completely water-insoluble. Yield 20 grams.

*Example 52*

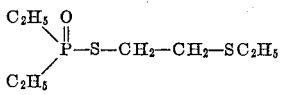

18.3 grams of ethyl-mercapto-ethyl mercaptan are mixed with 100 ml. of benzene and 15.2 grams of triethyl amine. There are added while stirring and cooling at about 20° C. 21.1 grams of diethylphosphinic acid chloride mixed with 30 ml. of benzene. Stirring is continued for 1 further hour at 20° C. The reaction mixture then is treated with 100 ml. of water, and the benzenic layer is separated. It is washed twice with 100 ml. of water and then dried over anhydrous sodium sulfate. After distilling off the solvent and fractionating there are obtained 19.9 grams of the new ester distilling at 0.01 mm. Hg at 79° C. Yield 59% of the theoretical. Toxicity on rats per os 10 mg./kg. 0.1% solutions kill aphids completely.

*Example 53*

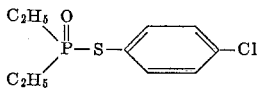

29 grams of p-chloro-thiophenol are dissolved in 750 ml. of benzene. There is added a sodium methylate solution containing 4.6 grams of sodium metal. Part of methanol and benzene are distilled off. While stirring there are added at 20 to 30° C. 28.1 grams of diethyl phosphinic acid chloride. Sodium chloride separates and after 20 to 30 minutes the reaction is completed. 10 ml. of water are added and the mixture is freed from sodium chloride by filtration with suction. After distilling off the solvent and fractionating in the usual way there are obtained 33.2 grams of the above shown ester distilling at 0.01 mm. Hg at 106° C. Yield 67% of the theoretical. Toxicity on rats per os 50 mg./kg. 0.1% solutions exhibit a 100% systemic action with aphids.

Example 54

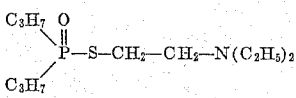

To a solution of 20 grams of N,N-diethylamino-ethyl-mercaptan in 100 ml. of benzene 15.2 grams of triethyl amine are added. While stirring and cooling at 20° C. there are added 25.3 grams of di-propyl phosphinic acid chloride dissolved in 30 ml. of benzene. Stirring is continued for 1 hour and 100 ml. of water are added. The benzenic layer is separated and washed and dried in the usual manner. After fractionating there are added 21 grams of the above new ester distilling at 0.01 mm. Hg at 82° C. The yield is 53% of the theoretical. $LD_{50}$ 5 mg./kg. 0.01% solutions kill aphids completely.

Example 55

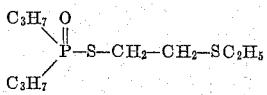

18.3 grams of ethylmercapto-ethyl-mercaptan and 15.2 grams of triethyl amine are dissolved in 100 ml. of benzene and while stirring there are added at 20° C. 25.3 grams of di-propyl phosphinic acid chloride. The mixture is worked up in the usual manner. There are obtained 26.5 grams of the new ester distilling at 0.01 mm. Hg at 89° C. The yield amounts to 69% of the theoretical. Toxicity on rats per os $LD_{50}$ 10 mg./kg. 0.01% solutions kill aphids completely.

Example 56

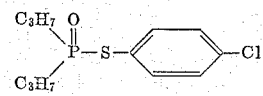

In the same way as described in Example 53 there are obtained from 29 grams of p-chlorophenyl and 34 grams of di-propylphosphinic acid chloride 46.3 grams of the above shown ester as a yellowish water-unsoluble oil. The yield is 83% of the theoretical. Toxicity on rats per os $LD_{50}$ 25 mg./kg.

Example 57

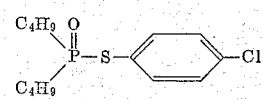

By the same way there is obtained from 29 grams of p-chloro-thiophenol and 40 grams of di-butyl-phosphinic acid chloride 51.8 grams of the above shown ester, i.e., 85% of the theoretical. $LD_{50}$ on rats per os 100 mg./kg.

Example 58

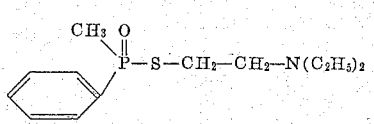

6 grams of powdered sodium are suspended in 100 ml. of benzene and at 50° C. there are added 33 grams of N,N-diethyl amino-ethyl mercaptane. After the sodium has disappeared there are added at 50° C. dropwise and while stirring 44 grams of methyl-phenyl-phosphinic acid chloride. After completion of the reaction by further stirring for 1 hour at 30° C. the reaction product is poured into 200 ml. of ice water. The benzenic layer is separated and dried with anhydrous sodium sulfate. After distilling off the solvent there are obtained 34 grams of the above shown new ester as a water-unsoluble yellow oil which is not distillable even in high vacuum. Yield 50% of the theoretical.

Example 59

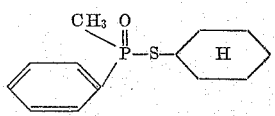

6 grams of sodium powder are suspended in 100 ml. of benzene. At 50° C. there are added while stirring 29 grams of cyclohexyl mercaptan. After continued stirring for 2 hours at the same temperature the sodium has disappeared. While stirring there are added then at 30° C. 44 grams of methyl phenyl phosphinic acid chloride, and the reaction mixture is kept for 1 further hour at this temperature. The working up procedure is the same as described before and there are obtained 44 grams of the new ester distilling at 0.01 mm. Hg at 104° C. The pure ester crystallizes and may be re-crystallized for further purification than melting at 56° C.

Example 60

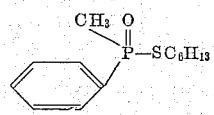

6 grams of sodium powder in 100 ml. of benzene are treated dropwise while stirring at 50° C. with 30 grams of hexyl-mercaptan. The mixture is held at this temperature for 1 further hour whereupon the sodium has disappeared. Then there are added while stirring and cooling at 30° C. 44 grams of methyl-phenyl-phosphinic acid chloride. This mixture is kept for 1 hour at the same temperature and afterwards worked up as described above. There are obtained 42 grams (66% of the thoretical) of the above ester distilling at 0.01 mm. Hg at 96° C. Toxicity on rats per os $LD_{50}$ 500 mg./kg.

Example 61

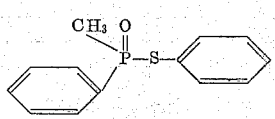

6 grams of sodium powder are dissolved in 100 ml. of benzene. While stirring there are added at 60° C. 28 grams of thiophenol. Heating is continued for 2 further hours whereupon the sodium has disappeared. Subsequently there are added while stirring at 50° C. 44 grams of methyl-phenyl-phosphinic acid chloride. The reaction product is kept for 1 further hour at this temperature and then worked up in the usual manner. There are obtained 46 grams of the new ester as a water-unsoluble yellow oil. Yield 74% of the theoretical; $LD_{50}$ on rats per os 250 mg./kg.

Example 62

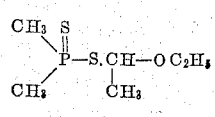

18 g. (0.25 mol) of ethylvinyl ether are introduced into a flask provided with stirrer. 32 g. (0.25 mol) of dimethyl-thionothiophosphinic acid (M.P. 59° C.) are added with stirring. The temperature rises to 100° C. The reaction is then completed. The mixture is then allowed to cool and the reaction product poured into water. The precipitated oil is taken up in benzene and neutralised with a 4% aqueous bicarbonate solution. Upon subsequent fractionation, 40 g. of the new ester are obtained in the form of a colourless, water-insoluble oil. The ester boils at 68° C. under a pressure of 0.01 mm. Hg. Yield 81% of the theoretical.

1000 mg./kg. on rats per os do not shown any symptoms

Example 63

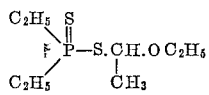

39 g. (0.25 mol) of diethyl-thionothiolphosphinic acid (liquid at room temperature) are introduced into a flask provided with stirrer. 18 g. of ethylvinyl ether are added dropwise with stirring starting at room temperature. The temperature of the reaction product rises to 70° C. Stirring is continued for a further hour and the product worked up as described in Example 1. 41 g. of the new ester are obtained as a colourless, water-insoluble oil. Yield 73% of the theoretical. The ester boils at 76° C. under a pressure of 0.01 mm. Hg.

1000 mg./kg. on rats per os do not show any symptoms.

Example 64

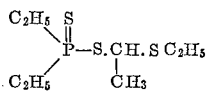

39 g. (0.25 mol) of diethyl-thionothiolphosphinic acid are introduced into a flask provided with stirrer. 22 g. (0.25 mol) of ethylthiovinyl ether (91°C./760 mm. Hg) are added dropwise with stirring starting at room temperature. The temperature of the reaction product rises to 70° C. Stirring is continued for a further hour and the product is worked up as described in Example 1. 45 g. of the new ester are obtained in the form of a water-insoluble, colourless oil. Yield 74% of the theoretical.

On rats per os mean toxicity 25 mg./kg.

The new ester of the above constitution has the following activity:

| | | |
|---|---|---|
| Flies | 0.1% | 100% |
| Aphides | 0.1% | 100% |
| Spider mites (gr. res.) | 0.1% | 100% |
| Systemic action/aphides | 0.1% | 90% |

Example 65

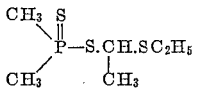

22 g. (0.25 mol) of vinylethyl sulphide are introduced into a flask provided with stirrer. 32 g. (0.25 mol) of dimethyl-thionothiolphosphinic acid (M.P. 59° C.) are added with stirring. The temperature rises to 110° C. The temperature is maintained at about 100° C. for one hour, and the reaction product is then introduced into water. After working up in conventional manner, 46 g. of the new ester of B.P. 72° C./0.01 mm. Hg are obtained. Yield 86% of the theoretical.

The new compound shows on rats per os a mean toxicity of 100 mg./kg.

Example 66

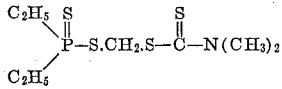

192 g. (1 mol) of diethyl-thionothiolphosphinic acid potassium salt are slowly stirred into 260 g. of chlorobromomethane. 100 cc. of water are added and the mixture is heated to 60° C. with further stirring for 2 hours. The reaction product is subsequently introduced into water, the precipitated oil is taken up in benzene and the benzene solution washed with a 3% aqueous bicarbonate solution until neutral. After distillation, the residue is fractionated. 90 g. of the ester of the following constitution

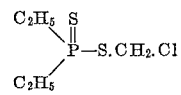

are obtained B.P. 68°C./0.01 mm. Hg. Yield 44% of the theoretical.

29 g. (0.2 mol) of powdered and dry dimethylamino-dithiocarbamic acid sodium salt are suspended in 100 cc. of acetonitrile. 41 g. (0.2 mol) of α-chloromethyl-diethyl-thionothiol-phosphinic acid ester (B.P. 68°C./0.01 mm. Hg) are added at 60° C. with stirring. The temperature is maintained at 80° C. for 2 hours and the reaction product is then introduced into water. The separated oil is taken up in benzene and washed neutral with water. After distilling off the benzene, the residual oil is kept at a bath temperature of 70° C. under a pressure of 0.01 mm Hg. In this way, 40 g. of the new ester are obtained in the form of a water-insoluble, yellow oil. Yield 76% of the theoretical.

Insecticidal values:

| | | |
|---|---|---|
| Flies (Drosophila) | 0.001% | 100% |
| Spider mites | 0.001% | 100% |
| Systemic action (aphides) | 0.1% | 70% |
| Caterpillars | 0.1% | 60% |

Examples 67

520 g. of chlorobromomethane are kept at 60° C. with stirring for about 2 hours with 330 g. (2 mols) of dimethylthionothiol-phosphinic acid potassium salt and 200 cc. of water. The reaction product is taken up in 500 cc. of chloroform, washed first with water and subsequently with a 3% bicarbonate solution. After drying with sodium sulphate, the product is fractionated. 100 g. of the ester having the following constitution

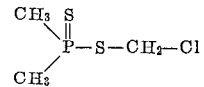

are obtained. B.P. 60°C./0.01 mm. Hg. Yield 28.6% of the theoretical.

48 g. (0.4 mol) of dimethylamino-dithiocarbamic acid sodium salt are dissolved in 200 cc. of acetonitrile, 50 g. of α-chloromethyl-dimethyl-thionothiol-phosphinic acid ester (B.P. 60° C./0.01 mm. Hg) are added dropwise at 60° C. with stirring. The reaction product is heated to 65° C. for one hour and then introduced into one litre of water. The new thiocarbamate:

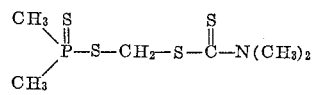

separates in the form of white crystals. 74 g. of the new thiocarbamate are obtained. After recrystallisation from alcohol, the product shows a melting point of 108° C. Yield 96% of the theoretical.

Example 68

113 g. (½ mol) of methyl-phenyl-thionothiol-phosphinic acid potassium salt are dissolved in 200 cc. of acetonitrile. 136 g. of chlorobromomethane are added at 35–40° C. with stirring, the temperature not rising above 40° C. The reaction product is kept at 40° C. for one hour and then taken up in 300 cc. of chloroform. It is first washed with water and subsequently with a 3% bicarbonate solution. After drying the solvent, the product is fractionated. 86 g. of the ester of the following constitution

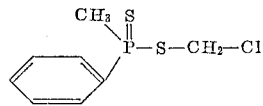

are obtained. B.P. 112° C./0.01 mm. Hg. Yield 73% of the theoretical.

48 g. (3/10 mol) of dimethylamino-dithio-carbamic acid sodium salt are dissolved in 200 cc. of acetontrile. 71 g. of α-chloromethyl-methyl-phenyl-thionothiol - phosphinic acid ester are added at 60° C. with stirring. The mixture is heated to 65° C. for one hour and the crude product is then introduced into 500 cc. of water. The separated oil is taken up in benzene and dried. After the solvent is distilled off, the resultant viscous oil is kept for a short time at a bath temperature of 70° C. under a vacuum of 0.01 mm. Hg. 85 g. of the new ester are thus obtained in the form of a viscous, water-insoluble oil. Yield 94% of the theoretical. The compound has the following constitution

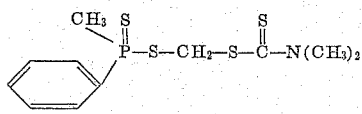

Example 69

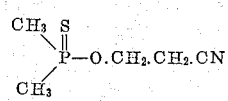

23 g. of pyridine and 18 g. (0.25 mol) of ethylene-cyano-hydrin are dissolved in 150 cc. of benzene. 33 g. (0.25 mol) of dimethyl-thiono-phosphinic acid chloride (B.P. 46° C./1 mm. Hg) are added at room temperature with stirring. The temperature of the reaction product rises to about 50° C. This temperature is maintained for a further 4 hours, the product is then cooled to room temperature and introduced into 200 cc. of ice water previously treated with 20 cc. of concentrated hydrochloric acid. The benzene solution is separated, washed with a 4% bicarbonate solution and subsequently dried with sodium sulphate. Upon fractionation of the benzene solution, 29 g. of the new ester of B.P. 84° C./0.01 mm. Hg are obtained. The ester is a colourless, scarcely water-soluble oil. Yield 71% of the theoretical.

Example 70

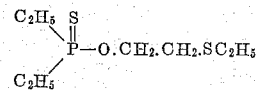

6 g. of sodium (0.25 mol) are finely dispersed in 100 cc. of toluene. 30 g. (0.25 mol) of β-ethylmercapto ethanol are then added at 50° C. with stirring. Stirring is continued for one hour. The sodium is then dissolved. The solution is cooled to 20° C. and 39 g. (0.25 mol) of diethyl-thiono-phosphinic acid chloride (B.P. 70° C./1 mm. Hg) are then added dropwise at the temperature indicated above with further stirring. The temperature is maintained at 20° C. for a further hour. The reaction product is subsequently introduced into 200 cc. of ice water. The toluene solution is separated and dried with sodium sulphate. Upon fractionation of the toluene solution, 40 g. of the new ester are obtained going over at 84° C. under a pressure of 0.01 mm. Hg. Yield 71% of the theoretical. The ester is a colourless, scarcely water-soluble oil.

Example 71

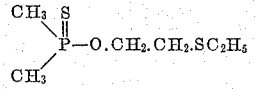

6 g. of sodium (0.25 mol) are finely dispersed in 100 cc. of toluene as described in Example 2. 30 g. of β-ethylmercapto ethanol are added at 50° C. After one hour the sodium is dissolved. The mixture is then cooled to 20° C. and 33 g. (0.25 mol) of dimethyl-thiono-phosphinic acid chloride are added. Stirring is continued at 20° C. for a further hour and the reaction product is then introduced into 200 cc. of ice water. The toluene solution is separated, dried with sodium sulphate and subsequently fractionated. 48 g. of the new ester is obtained as a colourless oil which goes over at 72° C. under a pressure of 0.01 mm. Hg. Yield 97% of the theoretical.

Example 72

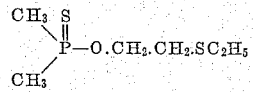

6.9 g. of sodium powder are suspended in 150 cc. of toluene. 35 g. (0.3 mol) of β-ethylmercapto ethanol are added dropwise at 40–50° C. with stirring. After one hour's stirring the sodium has gone into solution. 39 g. (0.3 mol) of dimethyl-thiono-phosphinic acid chloride are subsequently added dropwise at 50° C. Stirring is continued at 50° C. for a further half hour and the product is then cooled to room temperature. After the addition of 10 cc. of water to the reaction product, the sodium chloride formed is capable of being filtered. The filtrate is washed with water and subsequently dried with sodium sulphate. Upon fractionation of the filtrate, 40.2 g. of the new ester are obtained in the form of a colourless, water-insoluble oil of B.P. 55° C./0.01 mm. Hg. Yield 68% of the theoretical.

The ester shows on rats per os a toxicity of 250 mg./kg.

Example 73

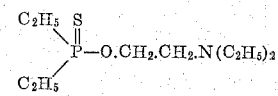

6 g. of sodium (0.25 mol) are finely dispersed in 100 cc. of toluene. 50 g. (0.25 mol) (excess) of diethyl-amino ethanol are added at 50° C. with stirring. The mixture is kept at 50° C. for one hour. The sodium has then gone into solution. The product is cooled to 20° C. and 39 g. (0.25 mol) of diethyl-thiono-phosphinic acid chloride are added with further stirring. Stirring is continued at 20° C. for one hour and the reaction product is then diluted with 400 cc. of toluene adding 200 cc. of ice water with stirring. The toluene solution is dried with sodium sulphate. Upon subsequent fractionation 57 g. of the new ester of B.P. 78° C./0.01 mm. Hg are obtained. Yield 96% of the theoretical. The ester is scarcely soluble in water.

Example 74

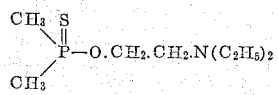

6 g. (0.25 mol) of sodium are finely dispersed in 100 cc. of toluene as described in Example 5. 50 g. (0.25 mol) of diethylaminoethanol (excess) are added at 50° C. After one hour the sodium has gone into solution. The mixture is cooled to room temperature and 33 g. of dimethyl-thiono-phosphinic acid chloride are subsequently added. The product is stirred at 20° C. for a further hour and then worked up in usual manner. 50 g. of the new ester are obtained as a colourless oil which goes over at 70° C. under a pressure of 0.01 mm. Hg. Yield 94% of the theoretical.

Example 75

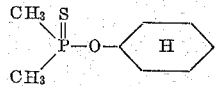

6 g. (0.25 mol) of sodium are dispersed in 100 cc. of toluene. 50 g. (0.25 mol) of cyclohexanol (excess) are added at 50° C. The temperature is kept at 50° C. for one hour. The sodium is then dissolved. The mixture is cooled at 20° C. and 33 g. (0.25 mol) of dimethyl-thiono-phosphinic acid chloride are added with further stirring. Stirring is continued at 20° C. for a further hour and the reaction product is then introduced into 200 cc. of ice water. It is thoroughly shaken, and the toluene solution dried with sodium sulphate. Upon distillation of the solvent, a viscous residue remains which solidifies in a short time in crystalline form. 42 g. of the new ester are obtained. Yield 87% of the theoretical. The ester may be recrystallised from ligroin. It then shows a melting point of 62° C.

*Example 76*

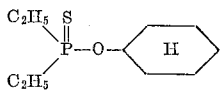

In a similar manner there are obtained from 6 g. (0.25 mol) of sodium dispersed in toluene, 50 g. of cyclohexanol and 39 g. (0.25 mol) of diethyl-thiono-phosphinic acid chloride, 46 g. of the new ester of B.P. 74° C./0.01 mm. Hg. Yield 84% of the theoretical. The ester is water-insoluble, colourless oil.

*Example 77*

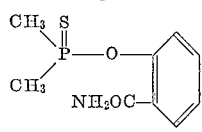

35 g. (0.25 mol) of salicylic acid amide (M.P. 140° C.) are dissolved in 100 cc. of methanol. A sodium methylate solution in which 0.25 mol of sodium are dissolved is added with stirring. The solution is heated to 50° C. for a half hour with stirring and then cooled to 20° C. 33 g. (0.25 mol) of dimethyl-phosphinic acid chloride are added at 20° C. with further stirring. Stirring is continued at 20° C. for one hour and the reaction product is then introduced into 200 cc. of ice water. The new ester separates as solid mass which may readily be filtered. The separated product is filtered off with suction, rubbed with ether and dried at room temperature. In this way, 30 g. of the new ester are obtained. Yield 53% of the theoretical. The ester is readily recrystallisable from ethyl acetate. It is obtained in the form of colourless needles showing a melting point of 139° C. The ester has on rats per os a toxicity of 100 mg./kg.

*Example 78*

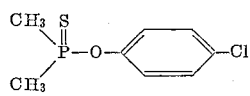

64 g. (0.5 mol) of p-chlorophenol are dissolved in 200 cc. of ethylmethyl ketone. 80 g. of dry and sifted potassium carbonate previously treated with 1 g. of copper powder are added to the solution. 65 g. (0.5 mol) of dimethyl-thiono-phosphinic acid chloride are added dropwise at 80° C. with stirring. The mixture is kept at 80° C. for 4 hours, then cooled to room temperature, the salts are filtered off with suction, and the filtrate is treated with 200 cc. of ice water. The separated oil is taken up with 300 cc. of chloroform. The chloroform solution is washed once with a 4% bicarbonate solution. The chloroform solution is then dried with sodium sulphate. After distilling off the solvent, an oil remains which rapidly solidifies in crystalline form. 80 g. of the new ester are obtained. Yield 72% of the theoretical. From a mixture of ethyl acetate/ligroin the new ester recrystallises as colourless needles of M.P. 50° C.

The ester shows on rats per os a mean toxicity of 250 mg./kg.

*Example 79*

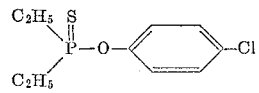

As described in Example 10, there are obtained from 32 g. (0.25 mol) of p-chlorophenol and 39 g. (0.25 mol) of diethyl-thiono-phosphinic acid chloride, 57 g. of the new ester as a water-insoluble, viscous oil. Yield 92% of the theoretical.

Calculated per mol 249: Cl=14.3%; S=12.8%; P=12.4%. Found: Cl=14.9%; S=12.2%; P=12.38%.

*Example 80*

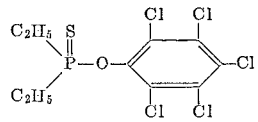

58 g. (0.2 mol) of pentachlorophenol sodium salt are suspended in 400 cc. of benzene. 31.4 g. (0.2 mol) of diethyl-thiono-phosphinic acid chloride are added dropwise at 60° C. with stirring. The mixture is kept at 60° C. for 2 hours. It is then cooled to room temperature and the salt is filtered off with suction. The filtrate is washed with a 4% aqueous bicarbonate solution. After drying with sodium sulphate, the solvent is removed in vacuo. The crystalline residue thus obtained is recrystallised from 300 cc. of thanol. In this way, 45 g. of the new ester of M.P. 121° C. are obtained as colourless crystals. Yield 58% of the theoretical.

*Example 81*

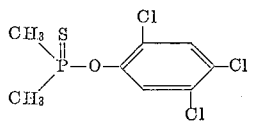

99 g. (0.5 mol) of 2,4,5-trichlorophenol are dissolved in 200 cc. of ethylmethyl ketone. A sodium methylate solution containing dissolved 0.5 mol of sodium is added to the first solution. 500 cc. of benzene are then added and the bulk of the solvent employed is distilled off. In this way, the water formed is azeotropically removed. The residue is taken up with 200 cc. of methylethyl ketone. 65 g. of dimethyl-thiono-phosphinic acid chloride are added at 20° C. with stirring. Stirring is continued at 20° C. for a further hour, and the reaction product is diluted with 200 cc. of water. 500 cc. of benzene are subsequently added and the mixture is thoroughly shaken. The benzene layer is separated, dried with sodium sulphate and the solvent subsequently removed in vacuo. The residue obtained solidifies in crystalline form. 86 g. of the new ester are obtained. Yield 59% of the theoretical. Recrystallised from ligroin, the new ester forms colourless needles of M.P. 79° C.

The new ester shows on rats per os a mean toxicity of 500 mg./kg.

*Example 82*

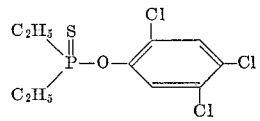

In an analogous manner there are obtained from 50 g. (0.25 mol) of 2,4,5-trichlorophenol and 39 g. (0.25 mol) of diethyl-thiono-phosphinic acid chloride, 63 g. of the new ester in the form of a water-insoluble, yellow oil. Yield 79% of the theoretical.

*Example 83*

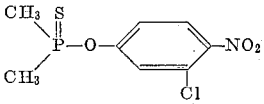

86 g. (0.5 mol) of 3-chloro-4-nitrophenol are dissolved in 200 cc. of methanol. A sodium methylate solution containing 0.5 mol of sodium is added to the first solution. The mixture is heated to 50° C. for one hour and then cooled to room temperature. 65 g. (0.5 mol) of dimethyl-thionophosphinic acid chloride are added at 20° C. with stirring. Stirring is continued at 20° C. for a further hour, and the reaction product is then diluted with 200 cc. of water. The separated oil is taken up in 400 cc. of chloroform. The chloroform layer is separated. The chloroform layer is dried with sodium sulphate. After distilling off the solvent, 46 g. of the new ester are obtained in the form of a yellow viscous oil which is not distillable even in a high vacuum. Yield 35% of the theoretical.

Calculated per mol 266: Cl=13.4%; S=12.0%; P=11.6%; N=5.3%. Found: Cl=13.7%; S=11.9%; P=10.8%; N=5.3%.

The new ester shows on rats per os a mean toxicity of 15 mg./kg.

*Example 84*

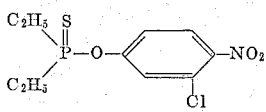

43 g. (0.25 mol) of 3-chloro-4-nitrophenol are dissolved in 100 cc. of non-aqueous alcohol. A sodium ethylate solution containing 0.25 mol of dissolved sodium is added with stirring. The mixture is heated to 60° C. for a half hour and subsequently cooled to room temperature. 39 g. (0.25 mol) of diethyl-thiono-phosphinic acid chloride are added at 20° C. with further stirring and stirring is continued at 20° C. for a further hour. After the usual working up, 48 g. of diethyl-thiono-phosphinic acid-4-nitro-3-chlorophenyl ester are obtained as a water-insoluble, pale yellow oil. Yield 66% of the theoretical.

Calculated per mol 294: N=4.7%; Cl=12.1%; S=10.9%; P=10.5%. Found: N=4.9%; Cl=12.4%; S=10.4%; P=10.5%.

*Example 85*

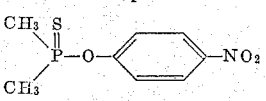

40 g. (0.25 mol) of p-nitrophenol sodium salt are dissolved in 150 cc. of methylethyl ketone. 33 g. of dimethyl-thiono-phosphinic acid chloride (0.25 mol) are added at 20° C. with stirring. Stirring is continued at 20° C. for a further hour and the reaction product is then treated with 300 cc. of ice water. The oil thus obtained is taken up in 200 cc. of benzene. The benzene solution is twice washed with water and subsequently dried with sodium sulphate. After distilling off the benzene, 28 g. of an oil are obtained which rapidly solidifies in crystalline form. Yield 48% of the theoretical. After recrystallisation from ethyl acetate, the new ester shows a melting point of 142° C.

*Example 86*

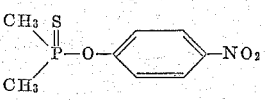

28 g. (0.2 mol) of p-nitrophenol are dissolved in 200 cc. of toluene. To this solution there are added 30 g. of powdered and sifted potassium carbonate previously treated with 0.5 g. of copper powder. 26.5 g. (0.2 mol) of dimethyl-thiono-phosphinic acid chloride are added dropwise at 60° C. with stirring. The mixture is subsequently heated to 90° C. for a further 3 hours. The salts are filtered off from the hot solution. Upon cooling of the filtrate, the new ester separates in crystalline form. After complete cooling, the crystals are filtered off with suction and briefly washed with ether. 25 g. of the new ester are thus obtained in the form of pale yellow needles of M.P. 142° C. Yield 54% of the theoretical.

The new ester shows on rats per os a mean toxicity of 100 mg./kg.

*Example 87*

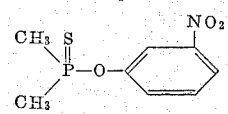

When instead of 28 g. of p-nitrophenol, 28 g. of m-nitrophenol are used and the process is otherwise carried out in the same manner as described in Example 18, 26 g. of the new ester of M.P. 96° C. are obtained. Yield 56% of the theoretical.

The ester shows on rats per os a toxicity of 25 mg./kg.

*Example 88*

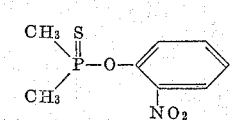

41.7 g. (0.3 mol) of o-nitrophenol are dissolved in 400 cc. of benzene. A sodium methylate solution containing 0.2 mol of dissolved sodium is added with stirring. 38.6 g. (0.3 mol) of dimethyl-thiono-phosphinic acid chloride are added dropwise at 60° C. and the mixture is kept at 60° C. for one hour. It is then cooled, 10 cc. of water are added and the salts are subsequently filtered off with suction. The filtrate is washed with water and dried with sodium sulphate. After distilling off the solvent in vacuo, the new ester is obtained first in the form of an oil. After the addition of a few millilitres of petroleum ether and stirring for a short time, the ester crystallises. 40 g. of colourless needles having a melting point of 60° C. are obtained. Yield 58% of the theoretical. The new ester has a toxicity on rats per os of about 100 mg./kg.

*Example 89*

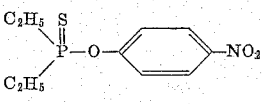

28 g. of p-nitrophenol (0.2 mol) are dissolved in 400 cc. of benzene. To this solution there is added with stirring a sodium methylate solution containing 0.2 mol of dissolved sodium. 31.4 g. (0.2 mol) of diethyl-thiono-phosphinic acid chloride are added dropwise at 60° C. The reaction product is kept at 60° C. for a further hour. It is then cooled to room temperature and 5 cc. of water are added. In this manner, the salts may readily be filtered. The filtrate is washed with a 4% bicarbonate solution. After drying over sodium sulphate, the solvent is removed in vacuo. 35 g. of the new ester are obtained in the form of a pale yellow oil which goes over at 121° C. under a pressure of 0.01 mm. Hg. Yield 68% of the theoretical.

The new ester shows on rats per os a toxicity of 10 mg./kg.

*Example 90*

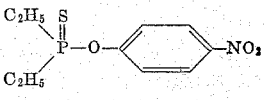

40 g. (0.25 mol) of p-nitrophenol sodium salt are dissolved in 150 cc. of ethylmethyl ketone. 39 g. (0.25 mol) of diethyl-thiono-phosphinic acid chloride are added at 20° C. with stirring. Stirring is continued at 20° C. for a further hour and the reaction product then introduced into 250 cc. of ice water. The separated oil is taken up with 300 cc. of benzene. The benzene solution is washed with a 4% aqueous bicarbonate solution and subsequently dried with sodium sulphate. After distillation of the solvent, a viscous oil remains which is kept for a short time at a bath temperature of 50° C. under a pressure of 0.01 mm. Hg. In this way, 56 g. of diethyl-thiono-phosphinic acid-p-nitrophenyl ester are obtained in the form of a pale yellow, water-insoluble oil. Yield 86% of the theoretical.

Calculated per mol 259: N=5.4%; S=12.35%; P=11.98%. Found: N=5.1%; S=12.1%; P=12.2%.

*Example 91*

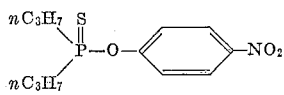

28 g. (0.2 mol) of p-nitrophenol are dissolved in 400 cc. of benzene. To this solution there is added a sodium methylate solution containing 0.2 mol of dissolved sodium. The mixture is heated to 60° C. 37 g. (0.2 mol) of di-n-propyl-thiono-phosphinic acid chloride (B.P. 96° C./1 mm. Hg.) are subsequently added dropwise at 60° C. The reaction product is kept at 60° C. for a further hour. After working up in usual manner, 45 g. of the new ester are obtained in the form of pale yellow crystals of melting point 80–81° C. (recrystallised from benzene/petroleum ether). Yield 78% of the theoretical.

The ester shows on rats per os a mean toxicity of 50 mg./kg.

*Example 92*

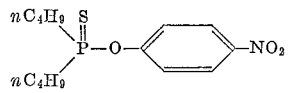

28 g. (0.2 mol) of p-nitrophenol are dissolved in 400 cc. of benzene. A sodium methylate solution containing 0.2 mol of dissolved sodium is added with stirring. The mixture is heated to 60° C. and 42.5 g. (0.2 mol) of di-n-butyl-thiono-phosphinic acid chloride (B.P. 116° C./1 mm. Hg) are added with further stirring. The reaction product is kept at 60° C. for a further hour. After working up in usual manner, 50 g. of the new ester are obtained in the form of pale yellow needles which have a melting point of 44° C. (recrystallised from aqueous ethanol). Yield 79% of the theoretical.

The new ester shows on rats per os a mean toxicity of 500 mg./kg.

*Example 93*

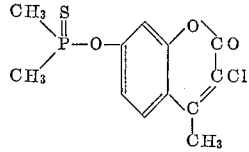

53 g. (0.25 mol) of 3-chloro-4-methyl-7-hydroxy-coumarin are dissolved in 250 cc. of ethylmethyl ketone. A solution of sodium ethylate containing 0.25 mol of dissolved sodium are added at 70–80° C. The mixture is kept at 80° C. for a half hour and 800 cc. of benzene are subsequently added. In this way, the sodium salt of 3-chloro-4-methyl-coumarin precipitates in crystalline form. The sodium salt is filtered off with suction and suspended in 200 cc. of acetonitrile. There is added with stirring acid chloride. The reaction product is kept at 20° C. for 2 hours, then cooled to room temperature and introduced into 400 cc. of ice water. The crystalline product thus obtained is washed with non-aqueous ether and subsequently dried at room temperature. 50 g. of the new ester are obtained in the form of colourless needles. Yield 66% of the theoretical. The ester can be recrystallised from acetonitrile. It then shows a melting point of 203° C.

Calculated per mol 303: Cl=11.7%; S=10.6%; P=10.2%. Found: Cl=12.0%; S=11.0%; P=9.9%.

The ester shows on rats per os a mean toxicity of 500 mg./kg.

*Example 94*

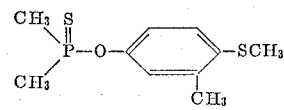

77 g. (0.5 mol) of 3-methyl-4-methylmercapto-phenol (M.P. 65° C.) are dissolved in 250 cc. of ethyl-methyl ketone. 80 g. of dry, pulverized potassium carbonate previously treated with 1 g. of copper powder are added to the solution. 65 g. (0.5 mol) of dimethyl-thiono-phosphinic acid chloride are subsequently added dropwise at 80° C. with stirring. The mixture is kept at 80° C. for a further 4 hours, then cooled to room temperature and the salts are filtered off with suction. 300 cc. of chloroform are added to the filtrate which is then washed with 200 cc. of ice water. The chloroform solution is dried with sodium sulphate. After removal of the solvent in a vacuum, the resultant ester solidifies in crystalline form. In this way, 70 g. of the new ester are obtained in the form of colourless needles. Yield 57% of the theoretical. Upon recrystallisation from ethyl acetate/ligroin, the ester shows a melting point of 70° C.

The ester has an activity on rats per os of 250 mg./kg.

*Example 95*

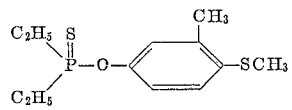

38.5 g. (0.25 mol) of 3-methyl-4-methylmercaptophenol are converted in conventional manner into the sodium salt. This sodium salt is suspended in 150 cc. of methyl-ethyl ketone. 39 g. (0.25 mol) of diethyl-thiono-phosphinic acid chloride are added at 20° C. with stirring. Stirring is continued at 20° C. for a further hour, and the reaction product is then introduced into 300 cc. of water. The oil is subsequently taken up in 300 cc. of benzene. The benzene solution is dried with sodium sulphate. After removal of the benzene in a vacuum, the new ester remains in the form of a viscous oil. The oil thus obtained is kept for a short time at a bath temperature of 40° C. under a pressure of 0.01 mm. Hg. In this way, 60 g. of the new ester are obtained as a pale yellow, water-insoluble oil. Yield 96% of the theoretical.

*Example 96*

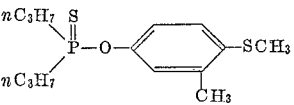

32 g. (0.2 mol) of 3-methyl-4-methylmercapto-phenol are dissolved in 300 cc. of benzene. To this solution a sodium methylate solution containing 0.2 mol of dissolved sodium is added with stirring. 37 g. of di-n-propyl-thiono-phosphinic acid chloride are added dropwise at 60° C. with further stirring. The reaction product is kept at 60° C. for one hour. It is then cooled to room temperature adding 5 cc. of water. The salts can now readily be filtered. The filtrate is worked up in the usual manner. 40 g. of the new ester are obtained as a pale yellow, water-insoluble oil of B.P. 127° C./0.01 mm. Hg. Yield 66% of the theoretical.

*Example 97*

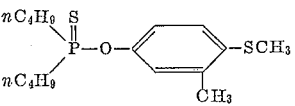

Under the same conditions as described in Example 28, there are obtained from 32 g. (0.2 mol) of 3-methyl-4-methylmercapto-phenol and 42.5 g. (0.2 mol) of di-n-butyl-thiono-phosphinic acid chloride, 44 g. of the new ester as a yellow, water-insoluble oil. B.P. 129° C./0.01 mm. Hg. Yield 66% of the theoretical.

*Example 98*

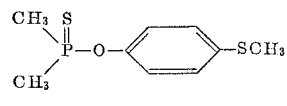

81 g. (0.5 mol) of the sodium salt of p-methylmercapto-phenol are dissolved in 150 cc. of methyl-ethyl ketone. 65 g. (0.5 mol) of dimethyl-thiono-phosphinic acid chloride are added at 20° C. with stirring. The mixture is kept at 20° C. for one hour and the reaction product is then introduced into 300 cc. of ice water. The separated oil is taken up in 300 cc. of benzene. The benzene solution is separated and dried with sodium sulphate. After working up in conventional manner, 75 g. of the new ester are obtained in the form of colourless needles of m.p. 53° C. Yield 65% of the theoretical. The ester shows on rats per os a mean toxicity of 50 mg./kg.

*Example 99*

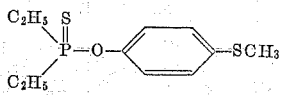

40.5 g. (0.25 mol) of the sodium salt of p-methyl-mercapto-phenol are dissolved in 125 cc. of methyl-ethyl ketone. 39 g. (0.25 mol) of diethyl-thiono-phosphinic acid chloride are added at 20° C. Stirring is continued for a further hour at room temperature and the product is worked up in the usual manner. 57 g. of the new ester are obtained as a viscous yellow oil. For purification, the ester is kept for a short time at a bath temperature of 40° C. under a pressure 0.01 mm. Hg in vacuo.

*Example 100*

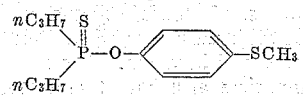

28 g. (0.2 mol) of p-methylmercapto-phenol are dissolved in 300 cc. of benzene. To this solution a sodium methylate solution containing 0.2 mol of dissolved sodium is added. 37 g. (0.2 mol) of di-p-propyl-thiono-phosphinic acid chloride are added dropwise at 60° C. with stirring. The product is kept at 60° C. for a further hour and then worked up in usual manner. 33 g. of the new ester are obtained as a pale yellow, water-insoluble oil of B.P. 117° C./0.01 mm. Hg. Yield 57% of the theoretical.

*Example 101*

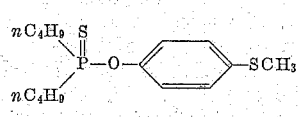

In analogous manner there are obtained from 28 g. (0.2 mol) of p-methylmercapto-phenol and 42.5 g. (0.2 mol) of di-n-butyl-thiono-phosphinic acid chloride 38 g. of the new ester as a pale yellow, water-insoluble oil of B.P. 130° C./0.01 mm. Hg. Yield 60% of the theoretical.

*Example 102*

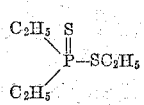

16 g. (0.25 mol) of ethylmercaptan are dissolved in 100 cc. of non-aqueous alcohol. A sodium ethylate solution containing 0.25 mol of dissolved sodium is added. The mixture is heated to 60° C. for a half hour and then cooled to 20° C. 39 g. (0.25 mol) of diethyl-thiono-phosphinic acid chloride are added at 20° C. with stirring. Stirring is continued at room temperature for one hour, and the mixture is then introduced into 200 cc. of ice water. The separated oil is taken up in 200 cc. of benzene and worked up in usual manner. 38 g. of the new ester are obtained as a pale yellow, water-insoluble oil of B.P. 90° C./1 mm. Hg. Yield 84% of the theoretical.

*Example 103*

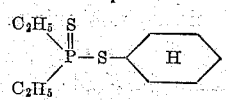

29 g. (0.25 mol) of cyclohexylmercaptan are dissolved solution containing 0.25 mol of dissolved sodium is in 100 cc. of non-aqueous alcohol. A sodium ethylate added with stirring. The mixture is heated to 60° C. for a half hour and then cooled to 20° C. 39 g. (0.25 mol) of diethyl-thiono-phosphinic acid chloride are added at 20° C. with stirring. After working up in usual manner, 44 g. of the new ester of B.P. 86° C./0.01 mm. Hg are obtained. Yield 75% of the theoretical.

*Example 104*

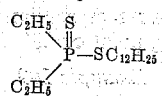

51 g. (0.25 mol) of dodecylmercaptan are dissolved sodium ethylate solution containing 0.25 mol of dissolved in 100 cc. of non-aqueous alcohol with the addition of a sodium. 39 g. (0.25 mol) of diethyl-thiono-phosphinic acid chloride are then added at 20° C. with stirring. Stirring is continued at room temperature for one hour and the product is worked up in usual manner. 50 g. of the new ester of B.P. 105° C./0.01 mm. Hg are obtained in the form of a colourless, water-insoluble oil. Yield 62% of the theoretical.

*Example 105*

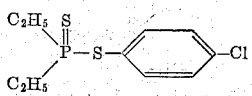

37 g. (0.25 mol) of p-chlorophenyl-mercaptan are dissolved in 100 cc. of non-aqueous alcohol. To this solution there is added a sodium ethylate solution containing 0.25 mol of dissolved sodium. The mixture is heated to 60° C. for a half hour and then cooled to room temperature. 30 g. (0.25 mol) of diethyl-thiono-phosphinic acid chloride are then added at room temperature. The product is kept at room temperature for a further hour and then worked up in usual manner. 48 g. of the new ester are obtained in the form of colourless crystals. M.P. 62° C. (from ligroin). Yield 72% of the theoretical.

*Example 106*

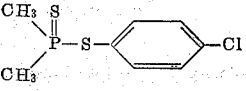

37 g. (0.25 mol) of p-chlorophenylmercaptan are dissolved in 100 cc. of methyl alcohol. To this solution there is added a sodium methylate solution containing 0.25 mol of dissolved sodium. The mixture is heated to 60° C. for a half hour and then cooled to 15–20° C. 33 g. (0.25 mol) of dimethyl-thiono-phosphinic acid chloride are then added with stirring. Stirring is continued at 20° C. for a further hour and the mixture is then instroduced into 200 cc. of ice water. The precipitated oil is taken up with 300 cc. of benzene. The benzene solution is dried with sodium sulphate. Upon distillation of the solvent, 51 g. of a colourless viscous oil are obtained which solidifies after a short time in crystalline form. Yield 86% of the theoretical. After recrystallization from ligroin, the new ester shows a melting point of 109° C.

*Example 107*

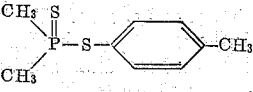

In analogous manner there are obtained from 31 g.

(0.25 mol) of p-methylphenylmercaptan and 33 g. (0.25 mol) of dimethyl-thiono-phosphonic acid chloride in the presence of the corresponding quantity of sodium methylate, 44 g. of the new ester. Yield 81% of the theoretical. After recrystallisation from ligroin, the ester shows a melting point of 76° C.

*Example 108*

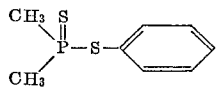

37 g. of the above ester are obtained from 28 g. (0.25 mol) of phenylmercaptan and 33 g. (0.25 mol) of dimethyl-thiono-phosphinic acid chloride and the corresponding quantity of sodium methylate. Yield 73% of the theoretical. After recrystallisation from ligroin the ester shows a melting point of 68° C.

*Example 109*

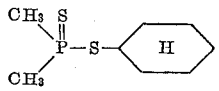

38 g. of the above ester are obtained from 29 g. (0.25 mol) of cyclohexylmercaptan and 33 g. (0.25 mol) of dimethyl-thiono-phosphinic acid chloride and the corresponding quantity of sodium methylate. Yield 73% of the theoretical. Upon recrystallisation from ligroin, the ester shows a melting point of 63° C.

*Example 110*

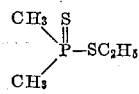

16 g. (0.25 mol) of ethylmercaptan are dissolved in 100 cc. of methanol. A sodium methylate solution containing 0.25 mol of dissolved sodium is added thereto. The mixture is heated to 60° C. for one hour and then cooled to room temperature. 33 g. (0.25 mol) of di-methyl-thiono-phosphinic acid chloride are added dropwise at 20° C. with strirring. Stirring is continued at 20° C. for one hour and the product is worked up in conventional manner. 22 g. of dimethyl-thionothiolphosphinic acid ethyl ester are obtained of B.P. 78° C./1 mm. Hg. Yield 57% of the theoretical.

*Example 111*

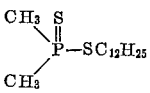

51 g. (0.25 mol) of dodecylmercaptan are dissolved in 100 cc. of methanol. A sodium methylate solution containing 0.25 mol of dissolved sodium is added with stirring and the solution is heated to 60° C. for a half hour. It is subsequently cooled to room temperature. 33 g. (0.25 mol) of dimethyl-thiono-phosphinic acid chloride are then added dropwise with further stirring which is continued at 20° C. for a further hour. After working up in conventional manner, 46 g. of dimethyl-thionothiolophosphinic acid-dodecyl ester of B.P. 84° C./0.01 mm. Hg. are obtained. Yield 63% of the theoretical.

*Example 112*

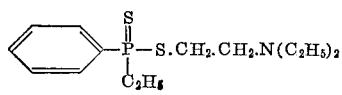

15 g. (0.11 mol) of N-diethylamino-β-ethylmercaptan are dissolved in 60 cc. of benzene. To this solution there is added with stirring a sodium ethylate solution containing 0.11 mol of dissolved sodium. Stirring is continued at room temperature for a further 10 minutes, and 22.5 g. (0.11) of ethyl-phenyl-thionophosphinic acid chloride (B.P. 126° C./2 mm. Hg) are then added dropwise at 20° C. with slight external cooling. The reaction product is kept at 30–35° C. for a further 3–4 hours with stirring and then treated with 100 cc. of ice water. Further 100 cc. of benzene are added, the mixture is thoroughly stirred and the benzene layer separated from the aqueous layer. The benzene solution is dried with sodium sulphate. The benzene is subsequently removed in vacuo. The residue thus obtained is kept for a short time at a bath temperature of 80° C. under a pressure of 2 mm. Hg. In this way, 26 g. of the new ester are obtained in the form of a brownish water-insoluble oil. The ester is not distillable even in a high vacuum. Yield 79° of the theoretical.

*Example 113*

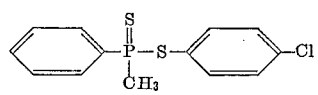

22 g. (0.15 mol) of p-chloro-thiophenol are dissolved in 100 cc. of benzene. To this solution there is added a sodium methylate solution containing 0.15 mol of dissolved sodium. Benzene and methanol are subsequently azeotropically distilled off. The dry residue is taken up in 120 cc. of acetone, and 29 g. (0.15 mol) of methylphenyl-thionophosphinic acid chloride (106–107° C./1 mm. Hg) are added dropwise at 20° C. with stirring. The mixture is kept at 50° C. for a further hour, then cooled to room temperature, and 150 cc. of ice water are added. By the addition of 100 cc. of chloroform the precipitated oil is taken up, dried with sodium sulphate, and the solvent is subsequently removed in vacuo. The resultant residue is kept for a short time at a bath temperature of 100° C. under a vacuum of 2 mm. Hg. 30 g. of the new thionothiol ester are thus obtained in the form of a pale yellow, water-insoluble oil. Yield 67% of the theoretical.

*Example 114*

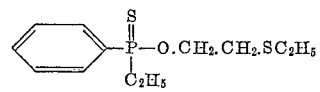

27 g. (0.255 mol) of 2-hydroxy-ethyl-thioether are taken up with stirring in 70 cc. of benzene with 38 g. (0.275 mol) of potassium carbonate and 1 g. of copper powder. 1 cc. of water is also added to the reaction product. 48 g. (0.235 mol) of ethyl-phenyl-thionophosphinic acid chloride (B.P. 126/2 mm. Hg) are then slowly added dropwise at 10° C. with stirring. The reaction product is subsequently stirred at 25–30° C. for 48 hours and then treated with 150 cc. of water. By the addition of 20 cc. of 25% ammonia, the dissolved copper is removed. 200 cc. of benzene are subsequently added and the mixture is thoroughly stirred. The benzene solution is dried with sodium sulphate. The solvent is then removed in vacuo. The residue thus obtained is kept for a short time at a bath temperature of 100° C. under a vacuum of 2 mm. Hg. 44 g. of the new ester are thus obtained in the form of a colourless, water-insoluble oil. Yield 68% of the theoretical.

*Example 115*

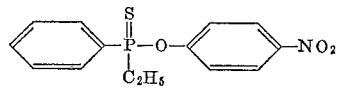

19 g. (0.118 mol) of p-nitrophenol sodium salt are dissolved in 100 cc. of methyl-ethyl ketone. 22.5 g. (0.11 mol) of ethyl-phenyl-thionophosphinic acid chloride (B.P. 126° C./2 mm. Hg), dissolved in 20 cc. of methyl-ethyl ketone, are added dropwise at 10° C. with stirring. The reaction product is heated to 50° C. for 3–4 hours and then cooled to room temperature adding 100 cc. of ice water. The reaction product is subsequently stirred with 200 cc. of benzene and the benzene layer is separated. After drying the benzene solution, the solvent is distilled off in vacuo. The solid residue thus obtained is recrystallised from a mixture of benzene/cyclohexane (1:1). 23 g. of the new ester are thus obtained in the form of a pale yellow, crystalline product of M.P. 56–58° C. Yield 64% of the theoretical.

*Example 116*

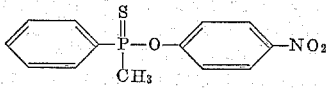

24 g. (0.145 mol) of p-nitrophenol sodium salt are dissolved in 150 cc. of methyl-ethyl ketone. The solution is treated dropwise at 10° C. with stirring with 25 g. (0.145 mol) of methyl-phenyl-thionophosphinic acid chloride (B.P. 106–107° C./1 mm. Hg). The mixture is subsequently stirred at 50° C. for a further 3–4 hours and then worked up as described in the preceding example. 23 g. of the new ester are thus obtained in the form of a pale yellow, crystalline product of M.P. 70–72° C. (after recrystallisation from benzene/petroleum ether). Yield 54% of the theoretical.

*Example 117*

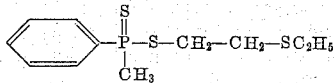

24.5 g. (0.2 mol) of 2-mercaptoethyl-thioether are run into a solution of 0.2 mol of sodium methylate in excess methanol at 15–20° C. and stirred for 15 minutes. 38 g. (0.2 mol) of methyl-phenyl-thiophosphinic acid chloride are subsequently added dropwise with slight external cooling, stirring is continued at 35° C. for a further 5 hours, and the mixture is then treated with ice water. The precipitated oil is taken up in chloroform, the chloroform solution is dried with sodium sulphate and the solvent is then completely removed (at the end at a heating bath temperature of 100° C. and under a pressure of 2 mm. Hg). The crude product is distillable in a high vacuum at B.P. 110–115° C./0.01 mm. Hg. Yield 41 g. (0.149 mol) of crude product, i.e., 74% of the theoretical Illustrative for the preparation of the starting materials are the following examples. Starting materials not described in the following when used within the foregoing examples may be prepared according to the methods described in the following:

*Example 118*

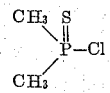

A suspension of 19 grams of bis-(dimethyl-thionophosphine) in 150 ml. of carbon tetrachloride is treated while stirring and cooling at about 20° C. with a solution of 71 grams of chlorine in 100 ml. of carbon tetrachloride. After a short while the bis-(dimethyl-thionophosphine) has disappeared. From slight impurities and unreacted material the solution is freed by filtration. The filtrate is fractionated. There are obtained 17 grams of the above compound distilling at 12 mm. at 73.5° C. The above phosphinic acid chloride melts at 22.5° C. The yield is 66% of the theoretical.

*Example 119*

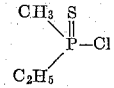

A suspension of 210 grams of bis-(dimethyl-thionophosphine) in 800 ml. of benzene are treated dropwise while stirring and cooling (18–20° C.) with a solution of 135.5 grams of sulfuryl chloride derived in 200 ml. of benzene. After a while a clear solution is obtained. After fractionating the reaction mixture at last in vacuum there are obtained 213 grams of dimethyl-thionophosphinic acid chloride. Yield 83% of the theoretical. B.P. at 12 mm. Hg at 73.5° C.

*Example 120*

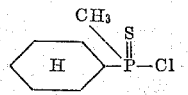

11 grams of bis-(methyl-cyclohexyl-thionophosphine) dissolved in 40 ml. of benzene are treated at 5 to 10° C. while stirring with 5 grams of sulfuryl chloride dissolved in 10 ml. of benzene; after 30 minutes the reaction mixture is fractionated. There are obtained 6 grams of methylcyclohexyl-thionophosphinic acid chloride distilling at 3 mm. Hg at 110–112° C.

*Example 121*

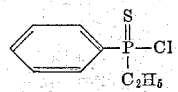

26 grams of bis-(ethyl-phenyl-thionophosphine) are dissolved in 100 ml. of benzene; at 10° C. There are added in anhydrous atmosphere 11 grams of sulfuryl chloride dissolved in 20 ml. of dry benzene. After 2 hours stirring at room temperature the reaction mixture is fractionated. There are obtained 23 grams of ethyl-phenyl-thionophosphinic chloride boiling at 2 mm. Hg at 126° C. Yield 73% of the theoretical.

*Example 122*

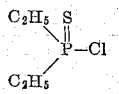

30.5 grams of diethyl-thiolphosphinite are added dropwise to a solution of 49 grams of carbon tetrachloride containing 2.8 grams of triethyl amine. The reaction is strongly exothermic and has to be kept at 50 to 60° C. by external cooling. The reaction mixture is washed with ice water, dried over anhydrous sodium sulfate and distilled. There are obtained 39 grams (78% of the theoretical) of the above shown ester as a colorless oil.

*Example 123*

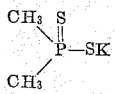

120 grams of potassium hydroxide are dissolved in 500 ml. of anhydrous alcohol. While stirring hydrogen sulfide is blown into this solution, until saturation. Then there are added dropwise while stirring at 30° C. 130 grams of dimethyl-thionophosphinic acid chloride. The reaction mixture has been kept at 40–50° C. for 1 further hour. The potassium chloride is filtrated with suction, and the remaining alcoholic solution subjected to distillation at least in vacuum. The remaining solid metal is treated with 200 ml. of benzene, and the crystallized potassium salt of the above formula removed by filtration with suction. It melts at 130° C. and the yield amounts to 91% of the theoretical.

*Example 124*

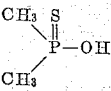

A solution of 48 grams of sodium hydroxide in 300 ml. of water is treated dropwise while stirring at 30° C. with 77 grams of dimethyl-thiophosphinic acid chloride. The reaction is exothermic and the temperature of the mixture rises to about 70° C. This temperature is kept for 30 more minutes and the clear solution then cooled at room temperature and treated with 50 ml. of concentrated hydrochloric acid (until the solution reacts Congo-acid). After saturation of the solution with sodium sulfate it is filtrated to remove some impurities. The pure filtrate is extracted 3 times with 250 ml. of chloroform. After drying over anhydrous sodium sulfate, the solvent is distilled off in vacuum. The remainder crystallizes and melts at 42° C. There are obtained 55.7 grams of the above compound, i.e., 84% of the theoretical, in hygroscopically colorless needles. The acid may be purified by re-crystallizing from benzene-petrol ether. It then melts at 45° C. The potassium salt may be obtained in exactly the same way and is also hygroscopical. The ammonium salt is less hygroscopical and melts at 152° C.

*Example 125*

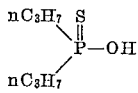

43.5 grams of di-n-propyl-thiophosphinic acid chloride is introduced slowly into a solution of 18.9 grams of sodium hydroxide in 150 ml. of water. The reaction temperature rises to 70° C. and is kept there for 1 further hour. The solution is cooled down at room temperature and there are added 20 ml. of concentrated hydrochloric acid. The mixture is extracted twice with 80 ml. of chloroform. The combined extracts are dried and the solvent is distilled off. The residue solidifies and consists of colorless hygroscopical crystals which melt at 33° C. The yield amounts to 37.6 grams, i.e., 96% of the theoretical.

*Example 126*

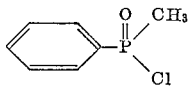

92 grams of methyl-phenyl-phosphinic acid ethyl ester are dissolved in 200 ml. of benzene. While stirring there are added 60 grams of thionyl-chloride at 70° C. Stirring is continued for 1 hour at said temperature, and the reaction product then is fractionated. There are obtained 75 grams of the above compound distilling at 1 mm. Hg at 98° C. Yield 85% of the theoretical.

*Example 127*

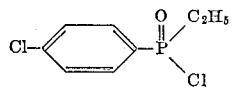

231 grams of ethyl-p-chlorophenyl-phosphinic acid ethyl ester are dissolved in 400 ml of benzene; at 50° C. there are added while stirring 120 grams of thionyl chloride. Heating is continued for 1 further hour at least until 75° C. The reaction product is fractionated. There are added 214 grams of ethyl-p-chlorophenyl-phosphinic acid chloride distilling at 0.01 mm. Hg at 105° C. The yield is 96% of the theoretical.

*Example 128*

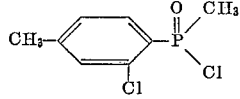

117 grams of methyl-4-methyl-2-chloro(phenyl)-phosphinic acid ethyl ester are dissolved in 200 ml. of benzene and there are added at 70° C. 60 grams of thionyl chloride. The temperature is kept for 1 further hour at 75° C. and the reaction product is fractionated. There are obtained 102 grams of the above compound distilling at 2 mm. Hg at 156° C. Yield 92% of the theoretical.

*Example 129*

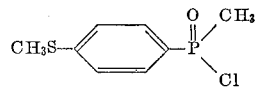

230 grams of methyl-p-methyl-mercapto-phenyl-phosphinic acid ethyl ester are dissolved in 200 ml. of benzene. While stirring there are added at 50° C. 120 grams of thionyl-chloride. The reaction mixture is kept for 1 further hour at 75° C. After distilling off the solvent there are obtained 218 grams of the above shown compound, which is already almost pure and melts at 65° C. The yield is almost quantitative.

*Example 130*

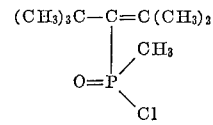

44 grams of methyl-isooctenyl-phosphinic acid ethyl ester are dissolved in 100 ml. of benzene. While stirring there are added dropwise at 50 to 55° C. 24 grams of thionyl chloride. Stirring is continued for 1 further hour at 55° C. and the mixture then is fractionated. There are obtained 31 grams of methyl-isooctenyl-phosphinic acid chloride distilling at 1 mm. Hg at 105° C. Yield 74% of the theoretical.

We claim:

1. A phosphinic acid ester of the following formula

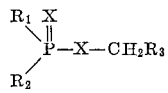

in which one X is a chalcogen having a molecular weight between 16 and 33 and the other X is sulfur, $R_1$ and $R_2$ are each alkyl groups having 1 to 6 carbon atoms and $R_3$ is a member selected from the group consisting of chlorophenyl, and methylmercaptophenyl.

2. A phosphinic acid ester of the following formula

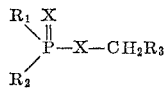

in which one X is a chalcogen having a molecular weight between 16 and 33 and the other X is sulfur, $R_1$ is an alkyl radical having 1 to 6 cabron atoms, $R_2$ is a phenyl radical and $R_3$ is methyl thio-anisyl.

3. A phosphinic acid ester of the following formula

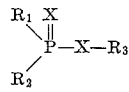

in which one X is a chalcogen having a molecular weight between 16 and 33 and the other X is sulfur, $R_1$ is an alkyl radical having 1 to 6 carbon atoms, $R_2$ is a phenyl radical selected from the group consisting of phenyl, lower alkylphenyl, chlorophenyl, bromophenyl, nitrophenyl, lower alkoxy phenyl and lower alkyl mercaptophenyl, the lower alkyl group of said lower alkyl phenyl containing up to 4 carbon atoms; and $R_3$ is a phenyl radical selected from the group consisting of phenyl, lower alkyl phenyl, chlorophenyl, bromophenyl and nitrophenyl.

4. A compound of the following formula

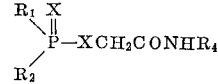

wherein $R_1$ and $R_2$ are each alkyl having up to 6 carbon atoms, one X is a chalcogen having a molecular weight between 16 and 33 and the other X is sulfur, and $R_4$ is alkyl having from 1 to 3 carbon atoms.

5. A compound of the formula

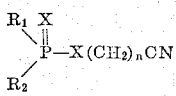

wherein $R_1$ and $R_2$ are each alkyl having up to 6 carbon atoms, one X is a chalcogen having a molecular weight between 16 and 33 and the other X is sulfur, and $n$ is an integer from 1 to 2.

6. S-(ethoxycarbonylmethyl) dimethyl phosphinodithioate.

7. O-(ethylthioethyl) dimethylphosphinothioate.

8. The method of controlling insects which comprises contacting the insects with a toxic amount of O-(ethylthioethyl) dimethylphosphinothioate.

References Cited by the Examiner
UNITED STATES PATENTS

| | | | |
|---|---|---|---|
| 2,653,161 | 9/1953 | Ballard et al. | 260—461 |
| 2,659,714 | 11/1953 | Harman et al. | 260—461 |
| 2,856,369 | 10/1958 | Smith et al. | 260—2 |
| 2,858,327 | 10/1958 | Higgins et al. | 260—461 |
| 2,881,200 | 4/1959 | Craig et al. | 260—461 |
| 2,961,458 | 11/1960 | Schegk et al. | 260—461 |
| 3,008,977 | 11/1961 | Schrader | 260—461 |
| 3,021,351 | 2/1962 | Schegk et al. | 260—461 |

FOREIGN PATENTS 1,109,724   9/1955   France.

OTHER REFERENCES

Arbuzov, Bull. Acad. Sci. U.S.S.R., Div. Chem. Sci., No. 2, page 191 (Feb. 1957).

Arbuzov et al., J. Russ. Phys-Chem. Soc., vol. 61, pp. 2037–42 (1929).

Chemical Abstracts, vol. 51, p. 5816, April 25, 1957 (abstract of Mel'nokov et al., U.S.S.R. 104, 225, granted Nov. 25, 1956).

Chemical Abstracts, vol. 51, cols. 16332–3 (1957) [abstract of Razumov et al., Zhur. Obschei Khim., vol. 27, 754–7 (1957)].

Chemical Abstracts, vol. 52, cols. 293–4 (Jan. 10, 1958) [abstract of Raxumov et al., Khim. i Primenenie Fosforogan Soedinenii, Akad. Nauk. S.S.S.R., Trudy 1-oi Konferents, 1955, pages 205–17 (pub.1957)].

CHARLES B. PARKER, *Primary Examiner.*

IRVING MARCUS, WALTER A. MODANCE,
*Examiners.*

JOHN D. RANDOLPH, FRANK M. SIKORA, RICHARD L. RAYMOND, *Assistant Examiners.*